United States Patent
Oberstein

(10) Patent No.: US 8,671,343 B2
(45) Date of Patent: Mar. 11, 2014

(54) CONFIGURABLE PIE MENU

(76) Inventor: Tobias Gregor Oberstein, Herzogenaurach (DE)

( * ) Notice: Subject to any disclaimer, the term of this patent is extended or adjusted under 35 U.S.C. 154(b) by 174 days.

(21) Appl. No.: 12/853,326

(22) Filed: Aug. 10, 2010

(65) Prior Publication Data

US 2012/0036434 A1 Feb. 9, 2012

(30) Foreign Application Priority Data

Aug. 6, 2010 (DE) .......................... 10 2010 036 906

(51) Int. Cl.
*G06F 3/14* (2006.01)

(52) U.S. Cl.
USPC ............. 715/702; 715/834; 715/863; 345/30; 345/111

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS

| | | | |
|---|---|---|---|
| 5,596,699 A | 1/1997 | Driskell | |
| 5,689,667 A | 11/1997 | Kurtenbach | |
| 5,701,424 A | 12/1997 | Atkinson | |
| 5,828,360 A | 10/1998 | Anderson | |
| 5,926,178 A | 7/1999 | Kurtenbach | |
| 5,943,039 A | 8/1999 | Anderson | |
| 6,094,197 A * | 7/2000 | Buxton et al. ................ | 715/863 |
| 6,549,219 B2 * | 4/2003 | Selker ........................... | 715/834 |
| 6,618,063 B1 | 9/2003 | Kurtenbach | |
| 6,918,091 B2 | 7/2005 | Leavitt | |
| 7,055,110 B2 | 5/2006 | Kupka | |
| 7,350,158 B2 | 3/2008 | Yamaguchi | |
| 7,603,633 B2 | 10/2009 | Zhao | |
| 2004/0095395 A1 | 5/2004 | Kurtenbach | |
| 2005/0044509 A1 | 2/2005 | Hunleth | |
| 2009/0265669 A1 * | 10/2009 | Kida et al. .................... | 715/863 |
| 2011/0055760 A1 * | 3/2011 | Drayton et al. ............... | 715/834 |

OTHER PUBLICATIONS

Don Hopkins, "Pie Menu Cookbook", 1987.
Don Hopkins, "The Design and Implementation of Pie Menus," Dr. Dobb's Journal pp. 16-27, Dec. 1991.
Gordon Paul Kurtenbach, "The Design and Evaluation of Marking Menus", 1993, p. 23-33.
Autodesk Maya 2008—screenshots.
Microsoft Inkseine—screenshots, Dec . 17, 2009.

* cited by examiner

*Primary Examiner* — Ruay Ho

(57) ABSTRACT

Systems, methods, and other implementations for a configurable pie menu are described herein. A pie menu has sectors of which at least one sector is both associated with a currently assigned menu item and at least one configuration menu. The operation of the pie menu is started by a pie menu activation input. Subsequent user input may then be interpreted as a pie menu selection input or a pie menu configuration invocation input. A pie menu configuration invocation input ascertains a pie sector and invokes the at least one configuration menu associated with the ascertained pie sector. The configuration menus provide a larger set of menu items, one of which is the menu item currently assigned to the pie sector. A menu item selected from the invoked configuration menu is assigned to the pie sector to which the configuration menu is associated.

21 Claims, 19 Drawing Sheets

CONFIGURABLE PIE MENU

FIELD OF THE INVENTION

The embodiments described herein relate to graphical user interfaces and gesture-based user interfaces for computers. More specifically, they relate to the configuration of pie menus.

BACKGROUND

Any discussion of third party references throughout the specification should in no way be considered as an admission that such references are widely known or forms part of common general knowledge in the field.

The first computers did not have user interfaces designed for convenient human-machine interaction. Programming was done by manually arranging the structure of the computer to perform the desired task, and output was displayed in low-level form. With increasing complexity of computers and the spread of their usage by non-specialist users, more refined user interfaces were needed and developed.

The typical user interface today for the vast majority of tasks that computers perform does not require the user to have a detailed understanding of the inner workings of a computer, nor does it require skills in reading and interpreting more than regular alphanumeric text and high-level graphical output.

Graphical User Interface

Graphic displays are the widely predominant output devices for modern computer user interfaces. Technical progress has seen a steady increase in both the size of screens and their resolution and color depth. Consequently most modern user interfaces for desktop machines have taken advantage of the screen space available and sought to optimize the user experience for large, high-resolution screens. They are also adapted for, and thus to a large degree dependent on, the availability of a keyboard and a mouse. The standard keyboard allows both text entry and the use of the large number of available keys as hotkeys to control program functions, while the standard mouse allows for precise pointer control and generally offers at least two mouse buttons that allow for further modification of the pointer input.

Linear Location Menus

The vast majority of all desktop systems today uses on-screen buttons in combination with linear location menus for most of the initial user interaction. Linear location menus have menu selection areas. A menu item selection area is an area within the pointer coordinate space of the pointing device. Pointer input within this area may be interpreted as selecting a menu item associated with the menu item selection area.

Selection here is accomplished by the user moving a pointer over the area of the on-screen button or of a menu item combined with a selection input, e.g. the click of a mouse button. This selection mechanism dependent on the current pointer position is often referred to as linear location selection and, when applied to menus, these menus are referred to as linear location menus.

In this model, often a subset of the options of a program is accessible through on-screen buttons, most often labeled with an icon, which directly invoke that option or action. For the complete set of options including less often used ones, linear location menus are employed. In these linear location menus, a linear list of menu items, most often vertically arranged, is presented. The presentation is most often in the form of a drop-down menu below a menu bar. Often a further set of options is displayed in reaction to this user choice, displayed next to the currently selected menu item. This process (called 'nesting' of submenus) can extend for a number of steps. A large number of modern programs, such as word processors and electronic spreadsheets, have hundreds of different functions that can be selected via the linear location menus. Selection can sometimes be accomplished with a keyboard, but is most commonly done employing a mouse.

FIG. 3 illustrates a linear location menu 350 as an example of the predominant graphical user interface paradigm in use on modern desktop computer systems. The menu has a menu bar 300 and menu items 310, 320, 330, 340 arranged vertically underneath.

Pie Menus

In pie menus, the menu items are displayed in a substantially circular arrangement around a center point. Each of the menu items, in addition to the icon or text representing the item, has a selectable area that is a pie menu sector, i.e. a sector of the entire pie menu. This area is usually, but not necessarily, sized so that each of the menu items covers an equal area. Thus, in a pie menu containing e.g. six items, each item would usually have a selectable area occupying 60 degrees of the full circle of the menu.

Pie menus are commonly implemented with a pie menu activation input that starts their operation. Subsequent input may then be interpreted as a pie menu selection input, i.e. an input that selects one of the pie menu sectors. Once a pie menu sector has been selected, usually the actions associated with the pie menu item assigned to that sector are executed.

One common type of implementation has the pie menu activation input assigned to a hardware control element such as a mouse button. Another type of implementation has an on-screen pie menu activation zone in which there needs to be an initial pointer down event that is then interpreted as a pie menu activation input. In these types of implementations the pie menu activation zone is a program-defined zone in the pointer coordinate space of the pointing device. Input that initiates within the pie menu activation zone may be interpreted as an input that operates the pie menu, such as but not limited to a pie menu selection input, In some implementations, the sectors extend to the borders of the screen. Here, selection of a pie menu item is often made with a stroke of the pointer, by which only the direction of the stroke is used to determine the selected pie menu item.

FIG. 4 shows an example of a pie menu 400. The menu items 430-437 are positioned in a substantially circular arrangement around a center point 405. The entire menu 400 is usually of circular shape and the sectors the menu items 430-437 are displayed with their sides formed by lines such as 420 extending outwards from the center 405. Pie menus often have an inactive area 410, surrounding center point 405 in the center of the menu. User input in this area cancels operation of the pie menu.

FIG. 5 shows a pie menu 500 that is implemented as a pop-up menu in a system with a hardware control element assigned as the pie menu activation input, e.g. a button on a mouse or a hotkey combination. The pie menu is operated in a display mode, i.e. there is displayed a graphical representation of the pie menu. This graphical representation is displayed at the current pointer position upon the pie menu activation input. The illustrated pie menu is stroke operated.

The user input 530 which is a stroke consists of moving the pointer from its starting point 510, to an end point 520 without interruption. Selection of a menu item 540 is determined based on the direction of the stroke 530, which means that the stroke 530 can extend as far the user desires and the pointing device allows. The user can cancel a selection by returning the pointer to the inactive area 550 in the center of the menu 500.

FIG. 6 shows the selection from a pie menu 600 in a non-display mode, i.e. there is no graphical representation of the pie menu. The user input 630 has a start point 610 and end point 620. Here the non-display mode lasts for a preset amount of time after the pie menu activation input, and the pie menu selection input takes the form of a flick, i.e. a substantially straight line between its beginning and end, ending with a pointer up event and being characterized by it being rapidly effected by the user. Menu item 640 is selected based on the direction of the flick.

The selection accuracy in a pie menu is related to the number of items the menu offers. Higher numbers of menu items require more angular precision for selection. An implementation of a pie menu has to consider the trade-off between the number of menu items and the ease of selection from the menu.

The most frequently implemented type of pie menu provides eight menu items and is often referred to as breadth-8 pie menus. Since this number of items can be arranged in a way such that the central axis of each menu item's selection area corresponds to one of the eight compass directions, eight items allow for a structure that is immediately familiar to the user and that helps user memorization of the menu item positions and the associated strokes for menu item selection.

SUMMARY

Systems, methods, and other implementations for a configurable pie menu are described herein. A pie menu has sectors of which at least one sector is both associated with a currently assigned menu item and at least one configuration menu. These associations can change dynamically. The operation of the pie menu is started by a pie menu activation input. Subsequent user input may then be interpreted as a pie menu selection input or a pie menu configuration invocation input. The pie menu allows for a mode of selection without the pie menu being displayed.

A pie menu configuration invocation input invokes the at least one configuration menu associated with a determined pie menu sector. The configuration menus provide a larger set of menu items, one of which is the menu item currently assigned to the pie menu sector. A menu item selected from the invoked configuration menu is assigned to the pie sector with which the configuration menu is associated. Additionally, any actions associated with the menu item selected from the configuration menu may be executed. The menu items contained in the configuration menus and their mode and details of display can change dynamically.

DETAILED DESCRIPTION

Figure 1:
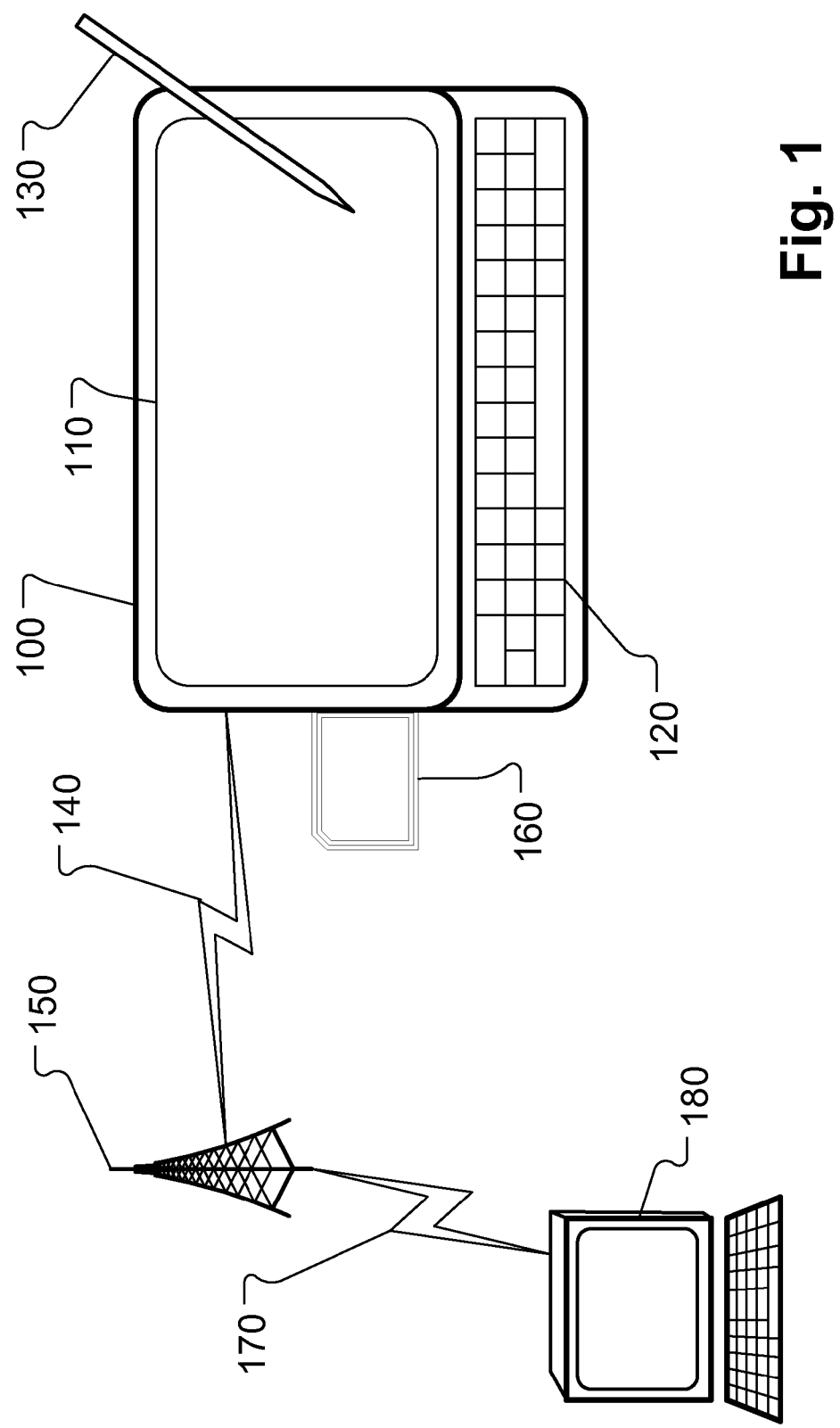
FIG. 1 illustrates an example computing device suitable for implementing at least one embodiment of a configurable pie menu.

Described herein are systems, apparatuses, and methods for implementing various embodiments of a configurable pie menu. In the course of this description, reference is made to the accompanying drawings that form a part hereof. Like reference numerals are used to refer to like elements throughout.

While specific configurations, features and arrangements are shown in the drawings and discussed, this is done for illustrative purposes only. A person skilled in the art will recognize that they can practice other embodiments of the invention without one or more of the steps, features or components described below, and that other configurations, features and arrangements may be used without departing from the spirit and scope of the invention.

Certain well-known details often associated with computing and software technology are not set forth in the following disclosure. In some cases, well-known structures and devices are shown in block diagram form in order to facilitate describing these elements.

In addition, the embodiments described herein may be implemented as a method or apparatus using commonly known programming and/or engineering techniques to produce software, firmware, hardware or any combination thereof to control a computer to implement the disclosed embodiments.

When reference is made to a mobile computing device it should be understood that other computing devices having the necessary components could be used to implement the invention.

Computing Device

A computing device for implementing one or more embodiments of a configurable pie menu is illustrated in FIG. 1. It is illustrated as a mobile computing device 100 that is connected to a wireless data network 150 through a wireless connection 140. Other network connections such as, but not limited to, wired Ethernet networks are also possible, and it should be appreciated that the principles of configurable pie menus may be utilized as well by devices that are not connected to a computer network.

The mobile computing device 100 includes a display 110. In the present illustration, the display 110 may be a touch screen for operation with a stylus 130, so that the display doubles as an input device. Other input devices such as, but not limited to, dedicated hardware keys, D-pads, mice, digitizer tablets, resistive or capacitive touch screens intended for finger or stylus operation or analogue joysticks may be used as well. Mass storage may be fixed internally or be provided through a removable storage means such as one or more flash memory storage cards 160. The device may also include a keyboard 120 and other means for input. Further, the mobile computing device 100 operates under the control of an operating system that may be locally or remotely based, and executes various computer software applications as well as system processes. In a device connected to a data network, computer software applications or some of their processes, including components of a configurable pie menu, may also be executed on a server or other computer 180 connected to the network by, for example, but not limited to, another wireless connection 170. The computer display 110 may be any type of display such as, most usually, but not limited to, an LCD, or an OLED. In addition to, or instead of, the display 110 as a touch screen and the keyboard 120, other input devices such as dedicated hardware keys, D-pads, mice, digitizer tablets, resistive or capacitive touch screens intended for finger or stylus operation or analogue joysticks may be used.

Suitable Architecture

Figure 2:
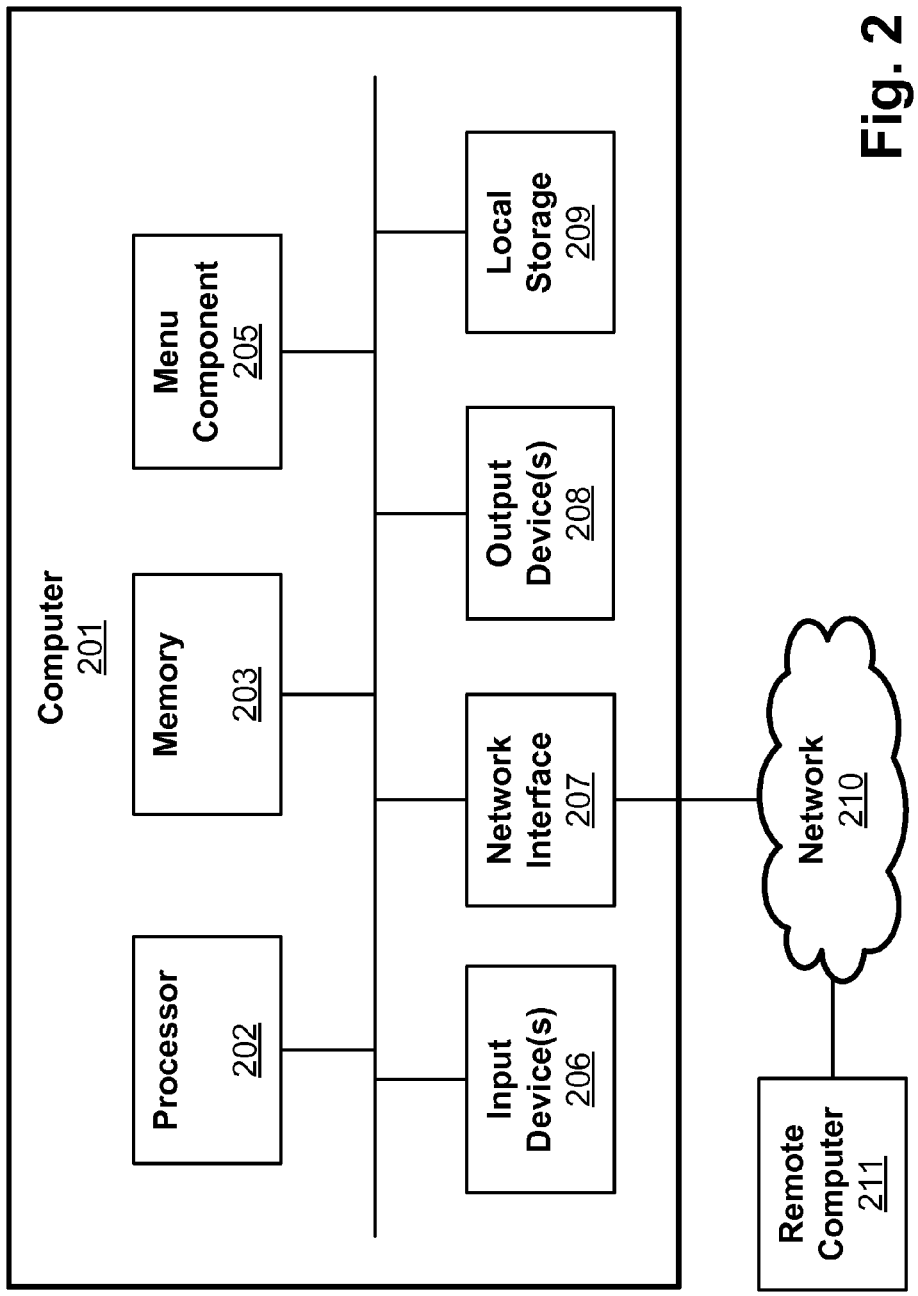
FIG. 2 illustrates an example system architecture suitable for implementing at least one embodiment of a configurable pie menu.
Figure 3:
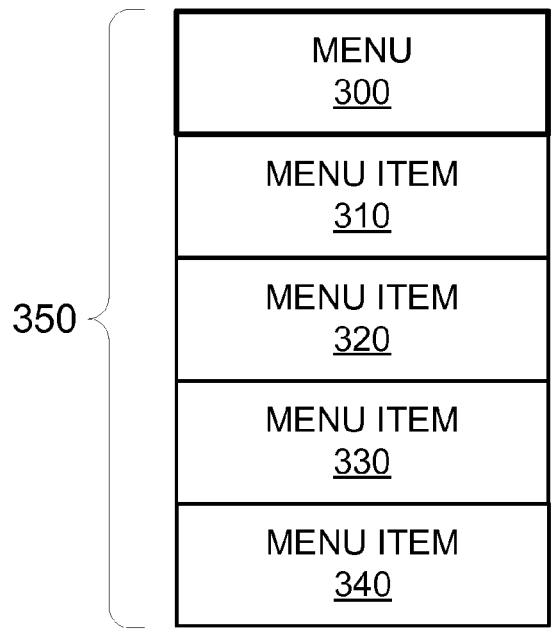
FIG. 3 illustrates an example of a linear location menu.
Figure 4:
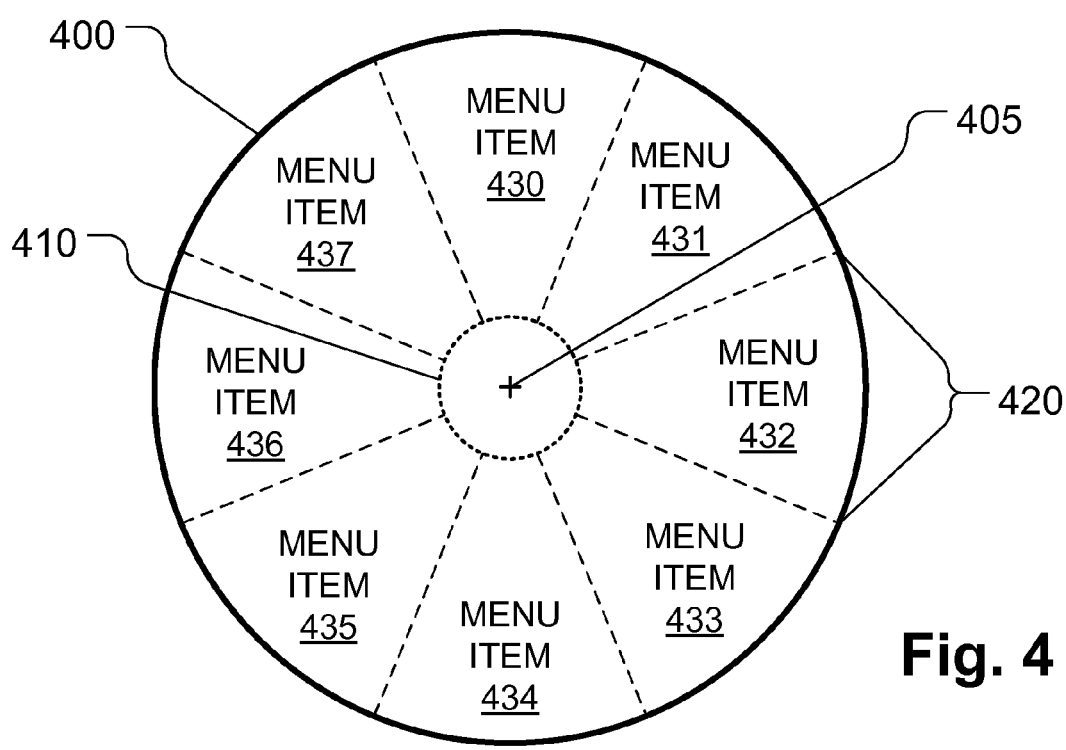
FIG. 4 illustrates an example of a pie menu being graphically displayed.
Figure 5:
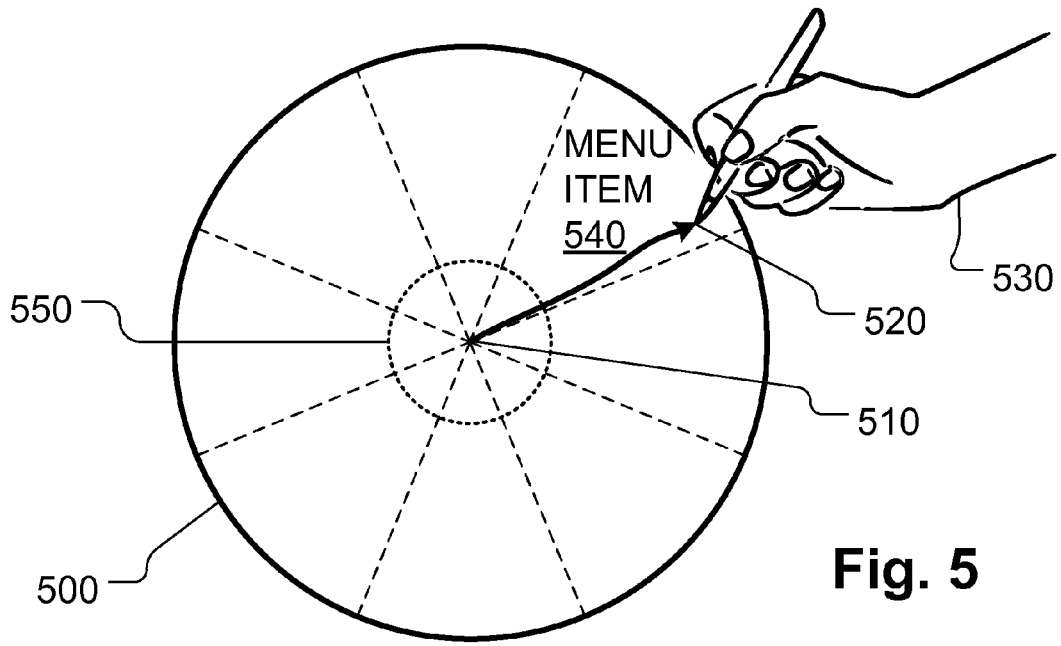
FIG. 5 illustrates the selection of a pie menu sector with the pie menu being graphically displayed.
Figure 6:
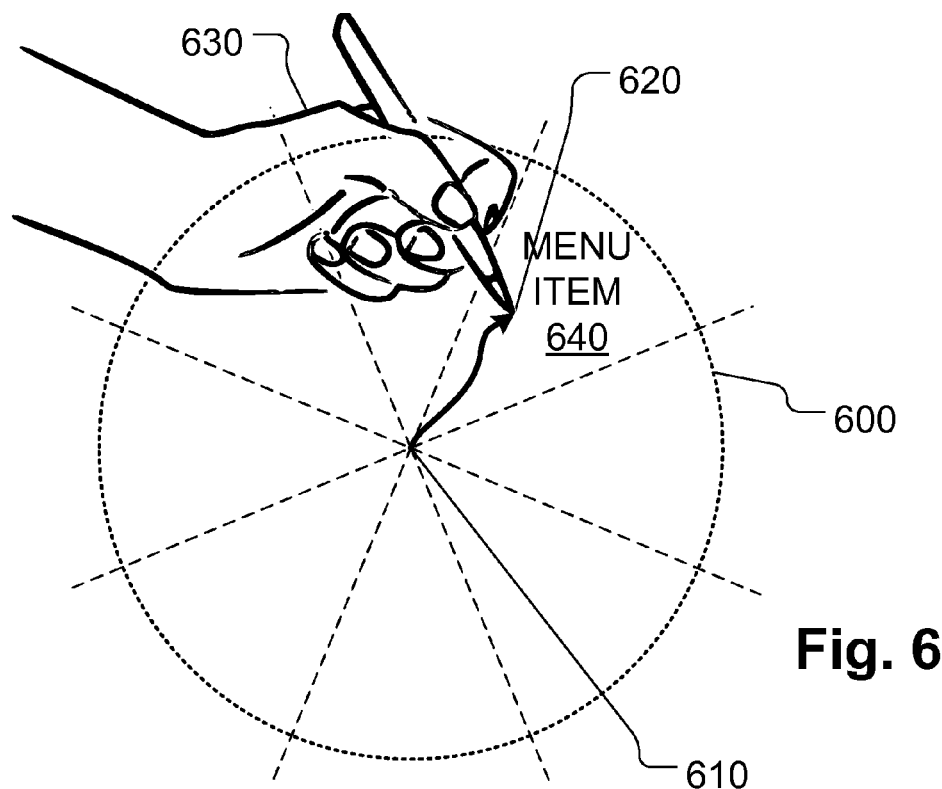
FIG. 6 illustrates the selection of a pie menu sector without the pie menu being graphically displayed.

FIG. 2 is a block diagram of a suitable architecture 200 (e.g. hardware architecture) for implementing one or more embodiments of a configurable pie menu. The architecture includes a computer 201 that is frequently connected to one or more remote computers 211 via a network interface 207 and network 210. Network 210 can be any type of network including but not limited to a Wi-Fi network, Ethernet network, GSM network, or 3G network. The computer 201 includes at least one processor 202; memory 203; at least one input device 206, and possibly additional input devices such as but not limited to keyboards, camera, microphone, game pad; and one or more output devices 208, e.g. displays, audio or tactile feedback. The user of computer 201 interacts with the computer 201 through the input and output devices 206, 208, respectively. User input relevant to a configurable pie menu is processed by a menu component 205 to translate relevant user input into changes in the menu system and to initiate menu commands. Computer 201 also includes a local storage device 209, which can be a computer-readable medium. A "computer-readable medium" here refers to any medium that can be part of the process of providing instructions to a processor for execution. This can include, amongst others, non-volatile media (e.g. magnetic or optical disks), volatile media (e.g. random access memory) and transmission media such as electrical busses, radio frequency waves or others. The computer readable medium does not need to be locally connected to the computing device, but could also reside on a remote computing device connected via a network.

System for a Configurable Pie Menu

Figure 7:
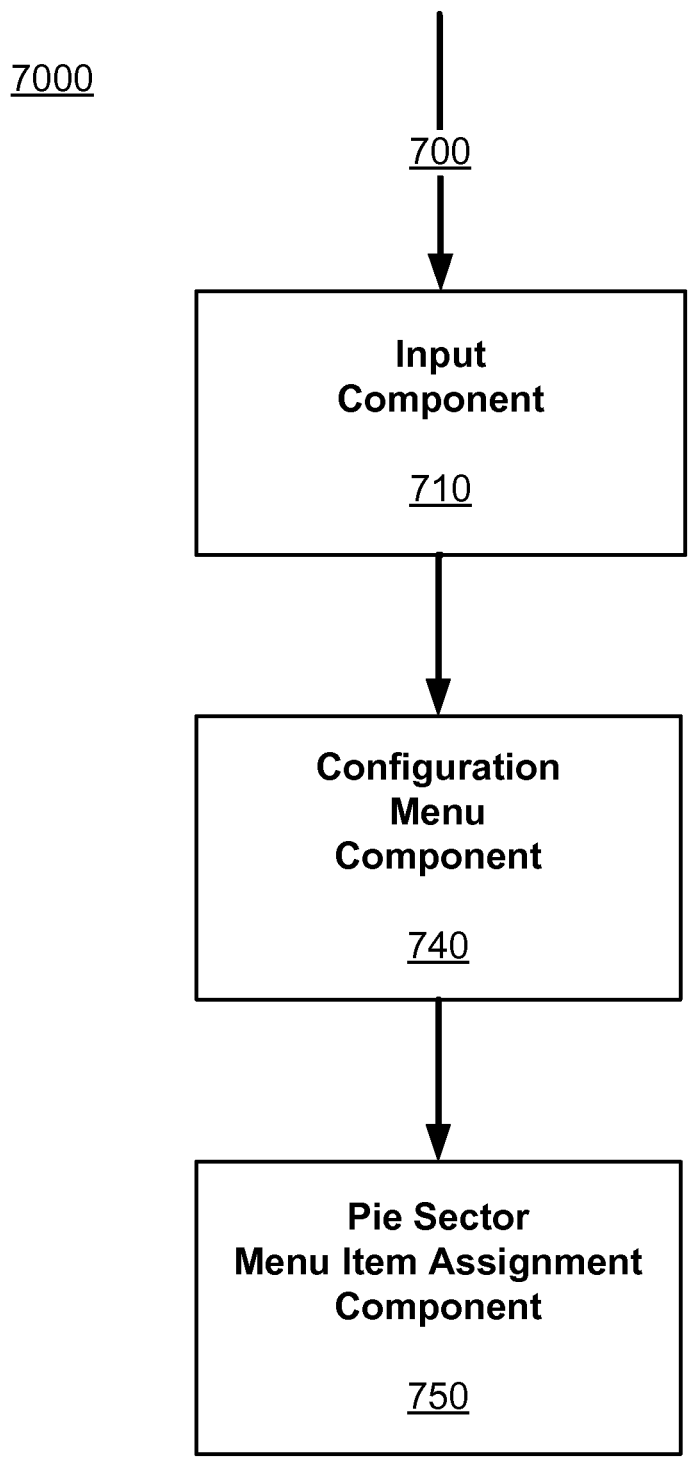
FIG. 7 illustrates an example system for at least one embodiment of a configurable pie menu.

FIG. 7 illustrates a system 7000 for the implementation of a configurable pie menu. The system 7000 can be used with a plurality of devices that employ menus as part of their interface. Such devices may include, but are not limited to, desktop and notebook computers, PDAs, smart phones, mobile internet devices.

The system 7000 comprises an input component 710 that receives user input 700. If the user input 700 is a pie menu activation input, then subsequent input may be interpreted as input that operates the pie menu, such as, but not limited to, a pie menu selection input or a pie menu configuration invocation input.

User input 700 as a pie menu activation input may be for example, but not limited to, operating a dedicated button or other hardware control element, operating a combination of buttons or other hardware control elements, a pointer gesture, pointer event in a pie menu activation zone, or a voice command.

The input component 710 is connected such that it may forward the user input 700 as a pie menu configuration invocation input to a configuration menu component 740.

The pie menu is characterized by at least one of the pie menu sectors being associated with at least one configuration menu and a currently assigned menu item.

In response to receiving a pie menu configuration invocation input, the configuration menu component 740 determines the invocation of a configuration menu. The configuration menu allows for the selection of a menu item from a plurality of menu items it provides.

The system 7000 additionally comprises a pie sector menu item assignment component 750 that changes the menu item currently assigned to a pie sector. The menu item is one from the plurality of menu items provided in the configuration menus associated with the pie sector. While the assignment may be effected by a user selection from the pie menu configuration menu, it is also possible that it is initiated program controlled or through some other mechanism.

The system 7000 may be implemented in a wide variety of ways. By way of illustration, preferred embodiments will be described in detail and with reference to drawings. Throughout the description of the preferred embodiments, other ways of implementing particular features will be mentioned. Neither the description of the preferred embodiments nor the other ways of implementing a particular feature is meant to limit the scope thereof.

Method for a Configurable Pie Menu

Figure 8:
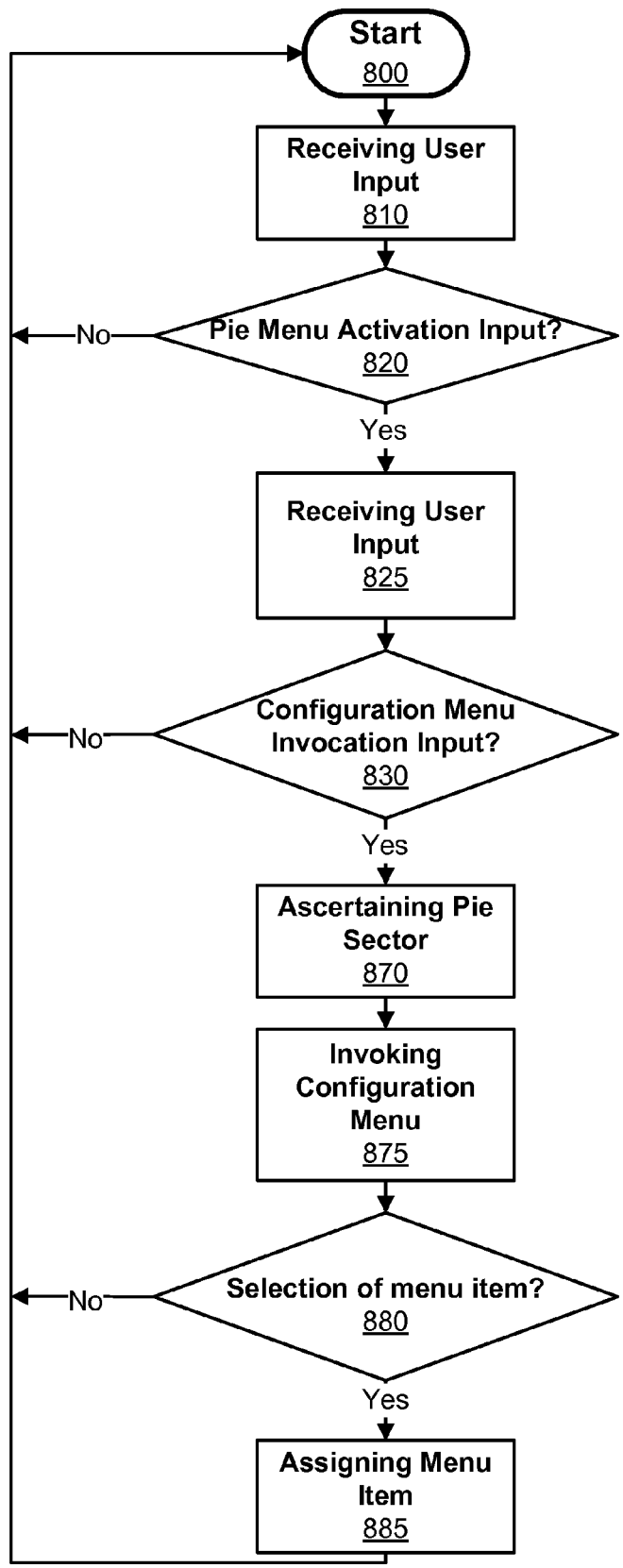
FIG. 8 illustrates a flow of an example method for implementing at least one embodiment of a configurable pie menu.

FIG. 8 illustrates a method for providing a configurable pie menu.

The flow starts 800 with the system receiving 810 a user input. It is then ascertained 820 whether the input is a pie menu activation input. If the input is ascertained 820 not to be a pie menu activation input, then the system returns to the start 800 of the flow.

If the input is ascertained 820 to be a pie menu activation input, then the system receives 825 a subsequent user input. It is then determined 830 whether the input is a configuration menu invocation input. If the input is determined 830 to be a configuration menu invocation input, then a pie sector is ascertained 870 based on the user input and the at least one configuration menu associated with this pie sector is invoked 875. The configuration menu then provides menu items for selection by the user. It is then determined 880 whether a menu item is selected. If a menu item is determined 880 to be selected it is then assigned 885 to the pie menu sector ascertained 870 previously. If no menu item is determined 880 to be selected, then the flow returns to the start 800.

If the user input is ascertained 830 not to be a configuration menu invocation input, then the flow starts 800 over.

Figure 9:
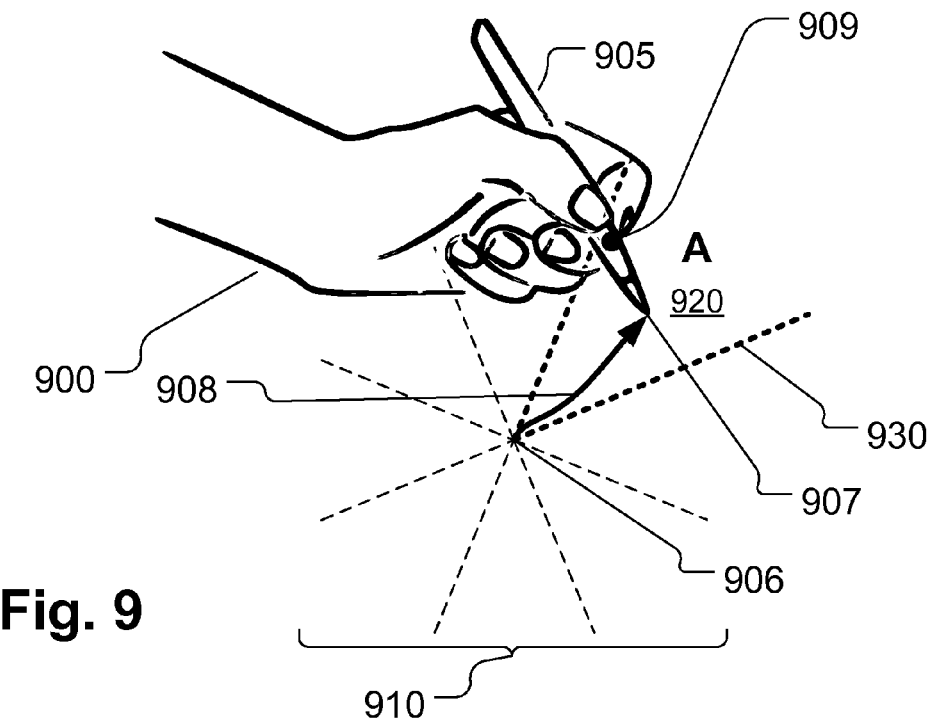
FIG. 9 illustrates a pie menu selection input in a non-display mode, in accordance with at least one embodiment of a configurable pie menu.

FIG. 9 illustrates a pie menu selection input 900 in an example embodiment of a configurable pie menu in a non-display mode, in which there is no display of a graphical representation of the pie menu 910. The pie menu selection input is subsequent to a pie menu activation input. In this embodiment, the pie menu activation input is effected through a press of the button 909 on the stylus 905. The selection of pie menu sector 930 is determined based on the direction of the pie menu selection input, i.e. on the direction of a flick 908 determined by its start point 906 and its end point 907. The menu item 920 presently assigned to the pie menu sector 930 is then determined and any actions associated with this menu item are executed.

It will be appreciated that while the pie menu selection input 900, or any other input, is here shown being effected using a stylus 905, any other input, including, but not limited to, finger-operated touch screens, touch pads, track points, mice, keyboards and analogue joysticks can be used for the pie menu selection input 900.

Figure 10:
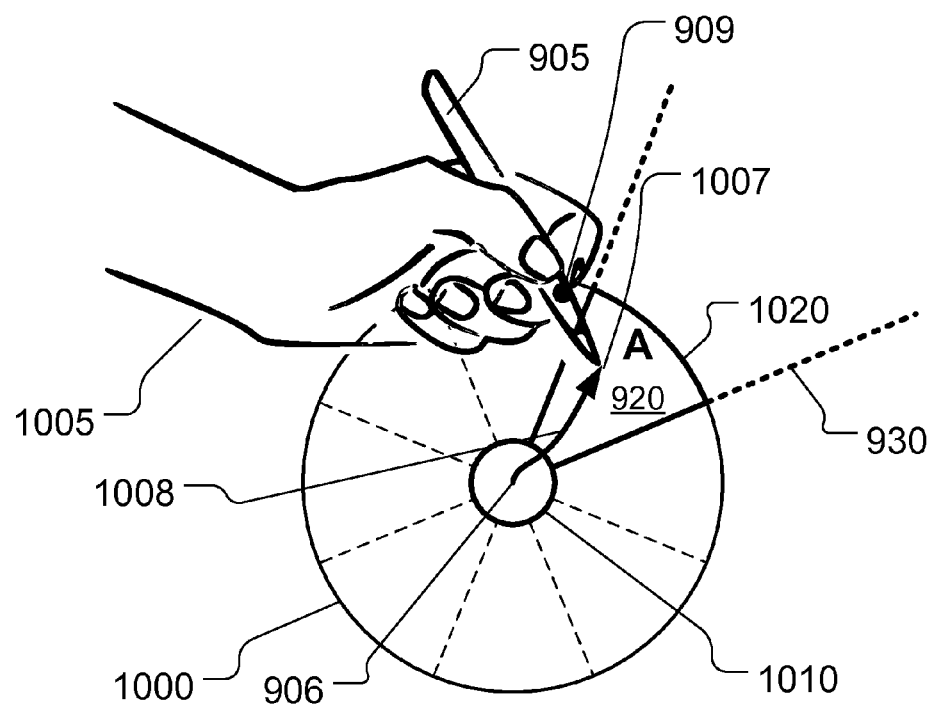
FIG. 10 illustrates a pie menu selection input in a display mode, in accordance with at least one embodiment of a configurable pie menu.

FIG. 10 illustrates an example embodiment of a pie menu selection input of a configurable pie menu in a display mode with the menu 1000 displayed. The pie menu selection input is subsequent to a pie menu activation input. In this embodiment a pie menu activation input is effected through a press of the button 909 on the stylus 905. A graphical representation of the pie menu 1000 is displayed centered on the point 906, which is the pointer position at the time of the pie menu activation input.

Pie menu 1000 includes an inactive zone 1010. A pointer up event within this inactive zone 1010 is interpreted as a cancellation of the operation of the pie menu. Here the pie menu selection input 1005, using a stylus 905, is a flick 1008 with a start point 906 and an end point 1007. The selection of pie menu sector 930, which has a graphical representation displayed 1020, is determined based on the direction of the flick 908, which itself is determined by its start point 906 and its end point 907. The menu item 920 presently associated with the pie menu sector 930 is then determined, and any actions associated with the menu item are executed. The display of the pie menu 1000 is subsequently cancelled.

The difference between the pie menu selection in a display mode, as illustrated by the example of FIG. 9, and a non-display mode, as illustrated by the example of FIG. 10, may be determined by a mode to which the menu is set, e.g. through user action or program-controlled. Such difference between the two modes may also be determined by differences in the user input. A pie menu selection input that is executed within a certain time limit, e.g. a quick flick, could lead to operation of the pie menu in a non-display mode, while slower execution of an otherwise identical stroke could lead to the display of the menu. Other variations of the pie menu selection input that lead to a display of the pie menu are possible within the scope of the embodiments described herein, e.g. a long tap before starting the flick, the use of buttons on the pointer device or elsewhere on the system on which configurable pie menus may be implemented.

Figure 11:
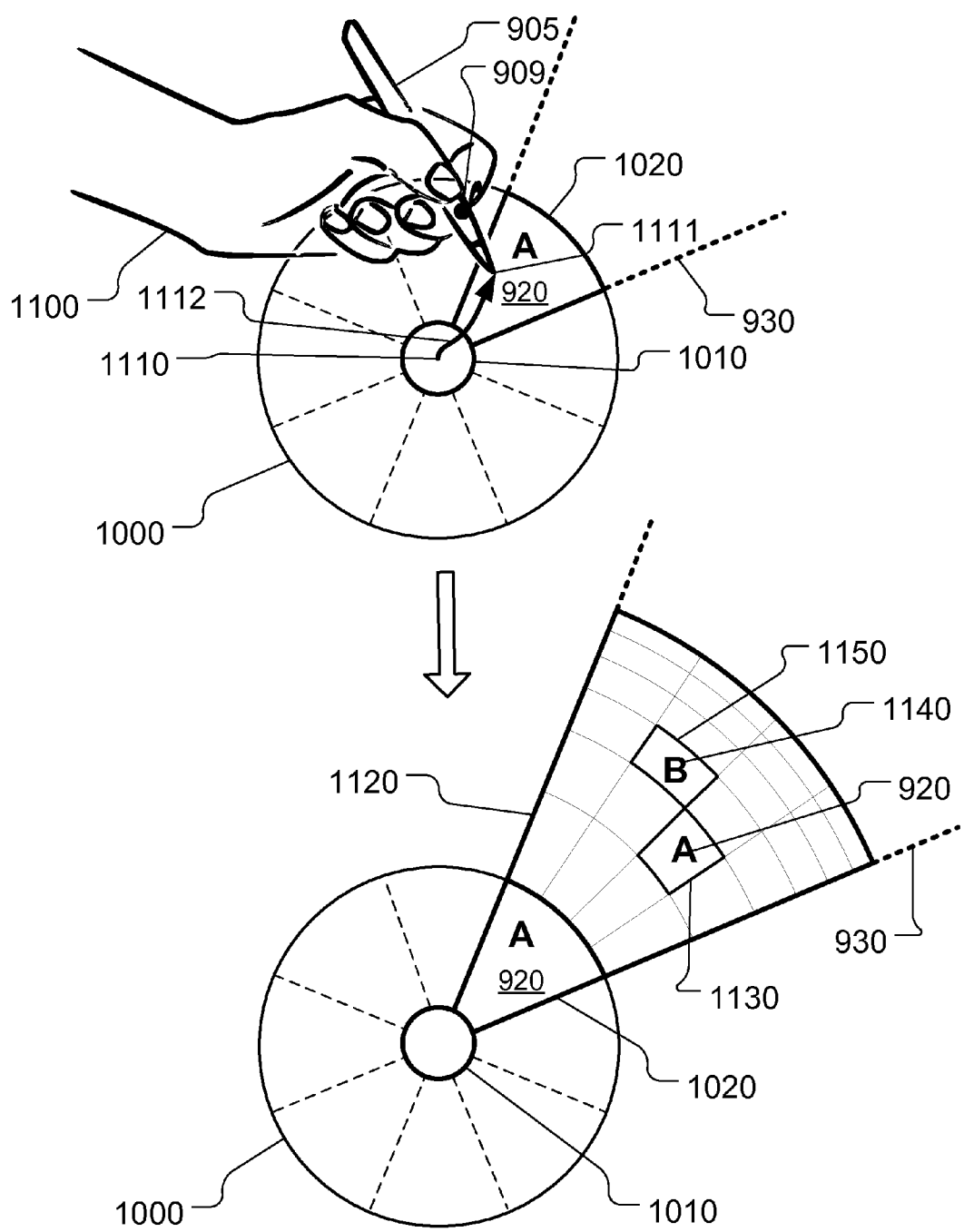
FIG. 11 illustrates an invocation of a configuration menu, in accordance with at least one embodiment of a configurable pie menu.

A pie menu configuration invocation input 1100, in pie menu 1000, is shown in FIG. 11. The pie menu configuration invocation input 1100, using a stylus 905 with a button 909, is made subsequent to a pie menu activation input which was effected through the pressing of a button 909 which here is assigned to perform this function. The pie menu has a graphical representation 1000 displayed, including an inactive zone 1010. The pie menu sector 930, whose associated configuration menu is to be invoked and with its graphical representation 1020 displayed, is determined based on the direction of the flick 1112, which itself is determined by its start point 1110 and its end point 1111. The configuration menu 1120 that is currently associated with the pie menu sector 930 is then determined and invoked.

Many, but not all, pie sectors will have at least one associated configuration menu. There may be, for example, cases in which a specific menu item is permanently assigned to a pie sector, e.g. the 'exit' command for a program, and it is not desirable to change this assigned menu item.

The pie menu configuration invocation input can be distinguished from the pie menu selection input in several ways. These distinctions may include, but are not limited to, temporal aspects of the user input, such as the amount of time that the execution of the stroke or flick takes, or an initial or final resting period of the pointer as part of the input, the use of additional buttons or other elements of the pointer device or the system on which the configurable pie menu is implemented, or any other data generated by the user input, such as a stylus pressure or angle when effecting the input, as well as a combination of two or more user input parts. Such combination of two user input parts may be, but is not limited to an initial flick followed by a tap ('flick-tap'), a tap followed by a flick ('tap-flick'), a sequence of two flicks in the same direction ('flick-flick') or sequence of two flicks with the second flick at substantially 180 degrees to the direction of the first flick ('flick-reverse').

The configuration menu 1120 associated with pie menu sector 930 and invoked by the pie menu configuration invocation input 1100 is graphically displayed in FIG. 11.

While FIG. 11 shows the display of the configuration menu as being simultaneous with the display of the pie menu, it will be appreciated that the display of the configuration menu could also be subsequent to that of the pie menu.

FIG. 11 shows the configuration menu immediately adjacent to the pie sector it is associated with, and being an outward extension of the pie sector. However, it may also be appreciated that the configuration menu could also extend the pie menu sector in some other way, be spatially related to the display of the pie menu, e.g. displayed at a set distance apart, or be wholly independent in its display location from the display location of the pie menu, e.g. if it is displayed at a fixed position on screen or takes up the entire screen. The association between a configuration menu and a pie sector may also be indicated through means such as, but not limited to, similar coloration, shading or patterning, or the use of a graphical indicator such as a schematic representation of the pie menu with an indication of the pie sector the displayed configuration menu is associated with if there is no simultaneous display of the pie menu and the configuration menu.

It will further be appreciated that the association of a pie sector with the at least one configuration menu need not be static. Some embodiments of a configurable pie menu may allow for the dynamic adjustment of the at least one configuration menu associated with a pie sector. This adjustment may be based on one or more of previous user input, usage context, usage history, program state, menu state, menu item state or other data.

It will further be appreciated that a display of the configuration menu need not be static. In some embodiments of a configurable pie menu, a display could be dynamically adjusted. This adjustment may be based on one or more of previous user input, usage context, usage history, program state, menu state, menu item state or other data. The adjustment may influence various aspects of the appearance of the configuration menu, such as, but not limited to, a size of the menu, a shape of the menu, a way the menu items are displayed, a size of the selection areas of individual menu items, groups of menu items or all menu items, a color scheme employed in the display of the menu, and a highlighting of menu items.

The configuration menu 1120 contains menu item selection areas 1130, 1150 which in turn are associated with menu items 920, 1140.

While the configuration menu 1120 provides a plurality of menu items that can be assigned to the pie menu sector to which the configuration menu is associated, the configuration menu can also provide other user interface elements. These elements may include, but are not limited to, sub-menus that open, upon selection of their selection areas, means for manipulating data associated with a menu item, such as a fader or other controller, or other elements that do not change the menu item assigned to a pie menu sector.

It should also be appreciated that the plurality of menu items provided by a configuration menu need not be static. Some embodiments of a configurable pie menu may allow for the dynamic adjustment of the plurality of menu items provided by the configuration menu. This adjustment may be based on one or more of previous user input, usage context, usage history, program state, menu state, menu item state or other data. One of the menu items associated with a menu item selection area in one of the at least one configuration menu associated with the pie menu sector 1020 graphically presented here is associated with the pie menu sector 930 itself.

Figure 12:
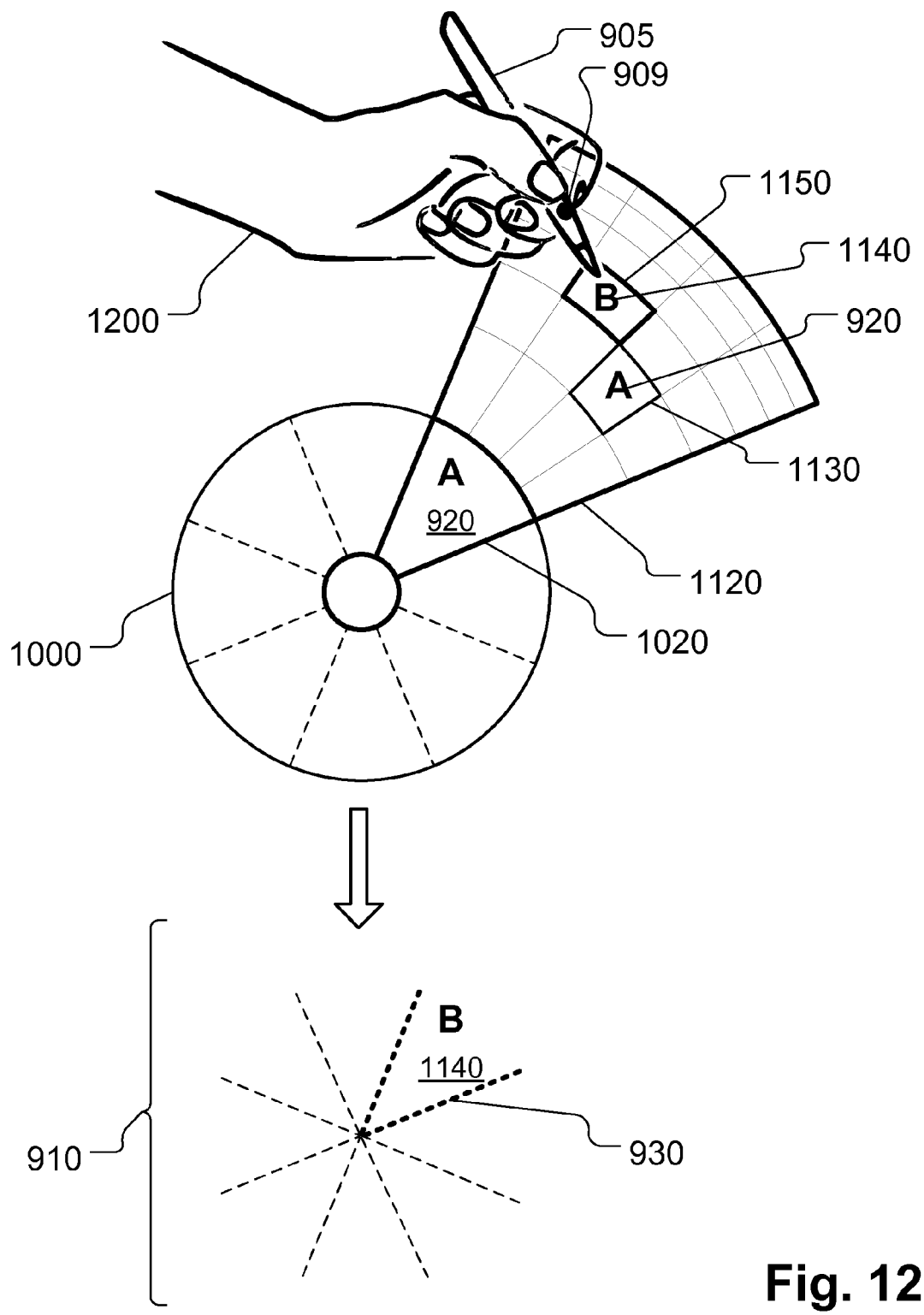
FIG. 12 illustrates a selection of a configuration menu item and the assignment of said menu item to a pie sector, in accordance with at least one embodiment of a configurable pie menu.

FIG. 12 illustrates a configuration menu item selection input 1200, in configuration menu 1120, using a stylus 905, with a current pointer position within the configuration menu 1120, in menu item selection area 1150 with the associated menu item 1140. There is a visual indication that menu item selection area 1150 with its associated menu item 1140 will currently be selected upon completion of the configuration menu item selection input 1200. This selection is based on the pointer end position being in the selection area 1150. The graphical indication visually differentiates menu item selection area 1150 with its associated menu item 1140 from menu item selection area 1130 with its associated menu item 920, as well as from other menu item selection areas.

It will be appreciated that while a visual feedback to the user input is generally desirable with regard to usability, such feedback is optional for embodiments of the configurable pie menu.

On completion of the configuration menu item selection input 1200, the menu item 1140 associated with the selected menu item selection area 1150 is assigned to the pie menu sector 930, replacing the previously assigned menu item 920 in the pie menu 910. In addition, any actions associated with the selected menu item may be executed.

Figure 13:
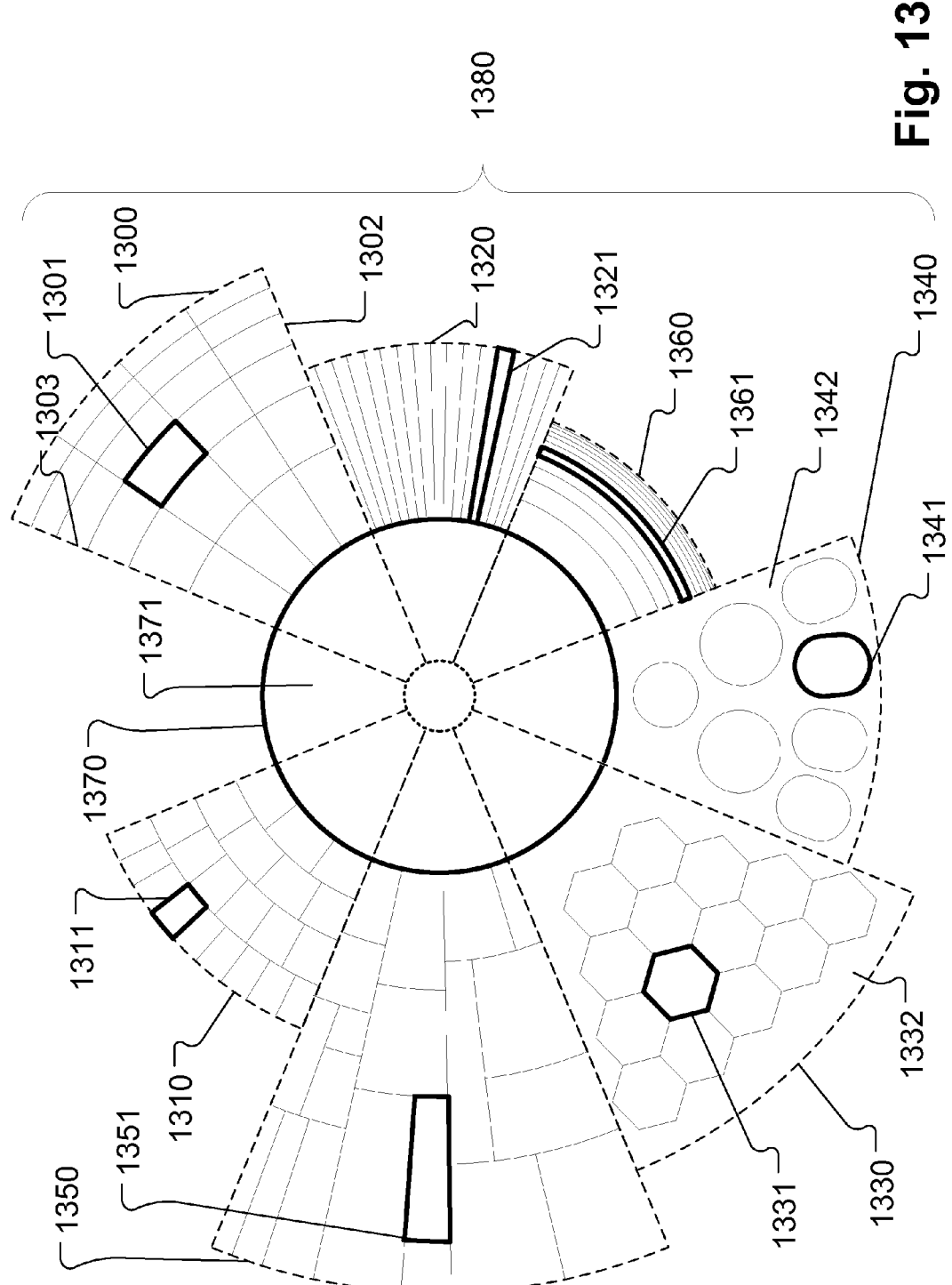
FIG. 13 illustrates various graphical representations and types of configuration menus, in accordance with at least one embodiment of a configurable pie menu.

FIG. 13 illustrates a pie menu 1370 with displayed configuration menus 1300, 1310, 1320, 1330, 1340, 1350, and 1360. The configuration menus 1300, 1310, 1320, 1330, 1340, 1350, and 1360 are displayed bordering the pie menu sectors. Pie sector 1371 may not have an associated configuration menu or there may be no display of such a menu concurrent with the display of other configuration menus.

In the exemplary embodiment shown in FIG. 13, the boundary lines 1302 and 1303 of a configuration menu 1300 are an extension of the boundary lines of the corresponding pie sector. However, other representations are possible, such as ones for which configuration menus are sized differently, e.g. to accommodate different numbers of menu items, and for which the correspondence between pie sectors and configuration menus is indicated by other graphical means, e.g. by similar coloration, shading, patterning or the use of a graphical indicator such as a schematic representation of the pie menu with an indication of the pie sector with which the displayed configuration menu is associated.

The configuration menus 1300, 1310, 1320, 1330, 1340, 1350, and 1360 each include at least one menu item selection area 1301, 1311, 1321, 1331, 1341, 1351, and 1361, respectively, that is each associated with a menu item. These menu item selection areas can be bordered by inactive areas 1332 and 1342, which surround them completely as in configuration menu 1340 or partially as in configuration menu 1330; or can be partitions of the entire area of the configuration menu as in sectors 1300, 1310, 1320, 1350, and 1360.

FIG. 13 illustrates several possible ways of segmenting the configuration menus of a pie menu 1380. The segmenting may be implemented by concentric circles (1360), radial lines (1320), a combination of both (1300), concentric circles and parts of radii set at different angles (1310), and tree map (1350). However, many other ways of segmenting the configuration menus can be employed. As FIG. 13 shows, different ways of segmenting configuration areas or arranging selection areas within them can be combined within a display. Furthermore the combination of several methods of segmenting configuration menus can be combined in one configuration menu.

The segmentation and presentation of the configuration menus can be influenced by various factors, e.g. the nature of the menu items to be displayed, the number of items, the need to include segments that invoke submenus, or to allow for adjustment of values of items before they are selected and the total area available for the configuration menu. The menus may be optimized for speed of access, for a high number of available menu items, to enable robust selection or to suit any other particular needs, or combinations thereof.

Menu items may be grouped functionally. In such grouping, menu items that serve a similar function or belong to a larger category of functionality are grouped into configuration menus.

As an example of such a functional grouping, a first pie sector may be associated with a configuration menu that provides different pen types, while a second pie sector may be associated with another configuration menu that offers correction means such as "undo" and "eraser" functions. In this case, in a note taking application for which the menu might be employed, a natural workflow for the user would be to alternate between drawing or writing on the display and correcting mistakes in the input. The changing of tools would be accomplished by making a flick selecting a first pie sector for the writing tool and a flick selecting a second pie sector for the correction tool. It would only be the precise nature of the tools invoked by each of the flicks that would change according to user selections from the configuration menus associated with the first and the second pie menu sector. The user could then memorize the association between a tool category and a pie menu sector.

Another example of functional grouping would include a pie sector, upon selection thereof, tagging or otherwise categorizing a currently displayed or edited document or part thereof. The precise nature of the tag or the category assigned would be determined by user selection from the configuration menu.

In case an entire pie menu is dedicated to control tagging, functional grouping could be according to the categories of tags, such as tags relating to persons, places, times etc being assigned to a particular pie menu sector.

Figure 14:
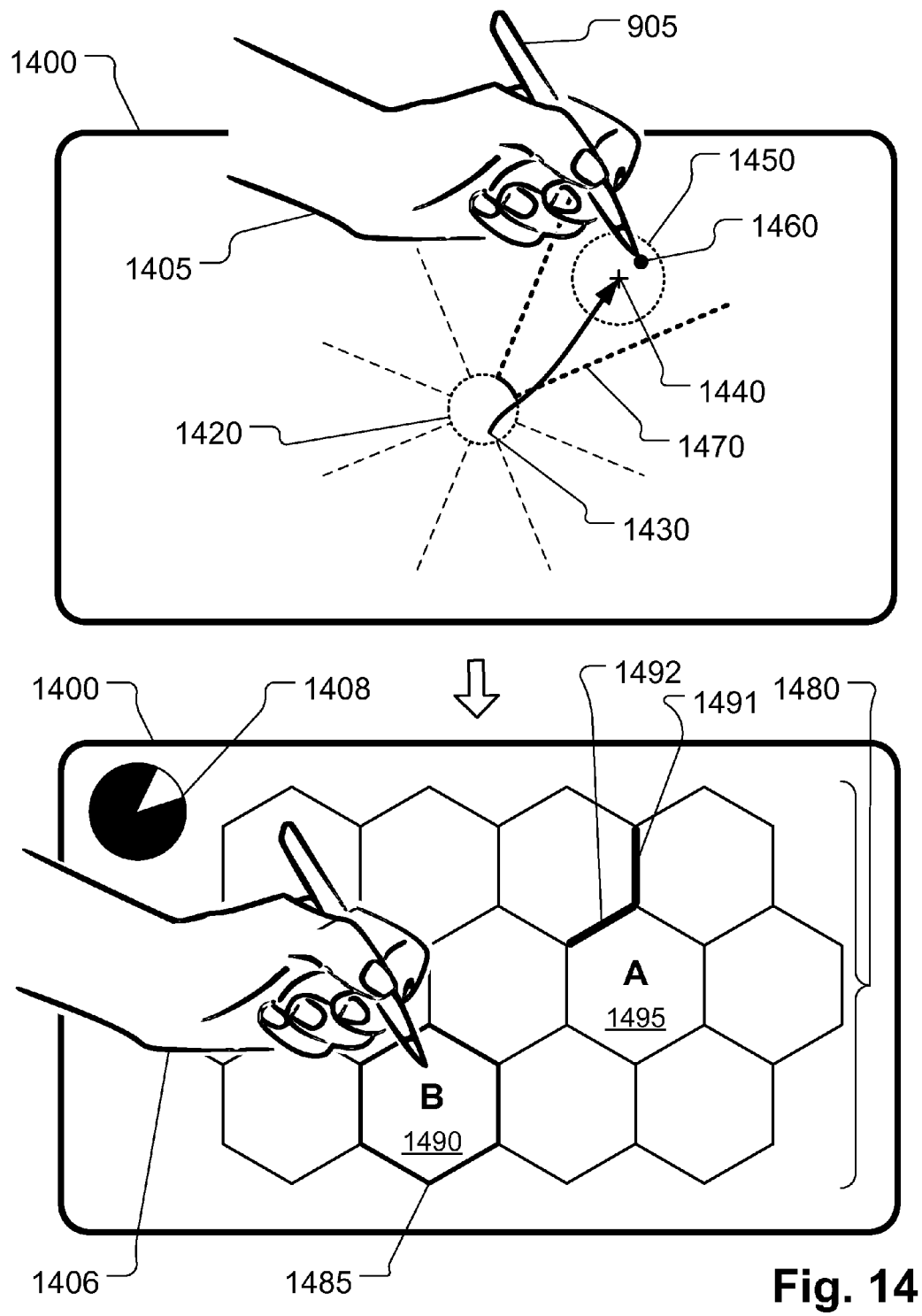
FIG. 14 illustrates a pie menu configuration invocation input and display of a configuration menu in the form of a full-screen overlay.

FIG. 14 shows another embodiment of a configurable pie menu. It shows a pie menu activation zone 1420 extending over an area on a screen 1400.

The graphical representation of the pie menu activation zone may have any shape or size that suits the need of a particular embodiment. Factors that influence design decisions here may be, but are not limited to, size of the display, mode of operation, e.g. using a stylus, finger, mouse or other input device, and aesthetic considerations. Both the size and the position of the pie menu activation zone may be fixed, user-controlled and/or program-controlled.

In many cases, while operation of a pie menu is possible in a non-display mode, the pie menu activation zone itself will be displayed on screen. There are, however, numerous embodiments for which not displaying the pie menu activation zone, as shown in FIG. 14, makes sense, e.g. ones that employ a digitizer tablet as an input device, and for which a fixed area like a corner of the digitizer tablet is dedicated as a pie menu activation zone. If there is a display of the pie menu activation zone on screen, the display may be static or dynamic, based on one or more of previous user input, usage context, usage history, program state, menu state, menu item state or other data. In a note-taking application on a stylus-operated device for example, the display could be hidden, while the user writes on-screen using the stylus, and appear once the user lifts the stylus, possibly with a short delay.

In cases where the pie menu activation zone is displayed on screen, it can be used to give the user visual feedback about at least one of previous user input, usage context, usage history, program state, menu state, menu item state or other data. By way of example, such feedback could include the currently selected tool in a note taking application, such as a current pen of a specific color, or a program state like the progress in saving the current file, or any other data that it would be convenient to make the user aware of.

Figure 22:
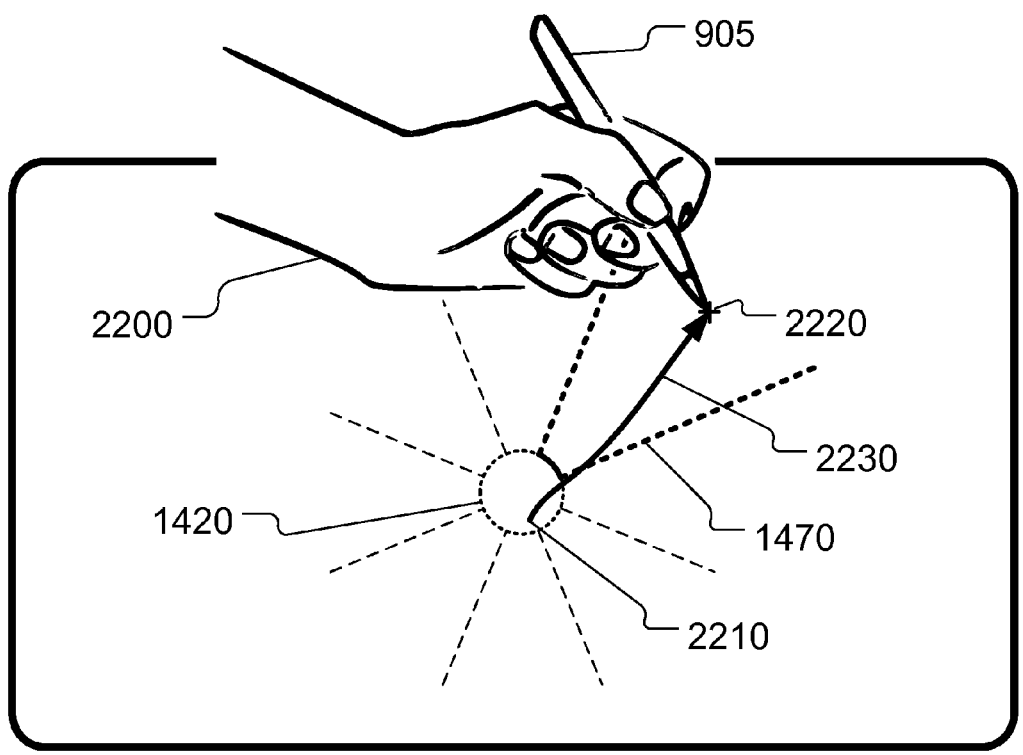
FIG. 22 illustrates a pie menu selection input for at least one embodiment of a configurable pie menu.

FIG. 22 shows pie menu selection input 2200 being effected using a stylus 905. It is subsequent to a pie menu activation input which here is a pointer down event at 2210 within the pie menu activation zone 1420. The pie menu selection input is a flick 2230 starting at the point 2210 and ending at the point 2220. A pie menu sector 1470 is ascertained based on the direction of this flick and any actions associated with the pie menu item currently associate with the pie menu sector are then executed.

Referring back to FIG. 14, the pie menu configuration invocation input 1405, employing a stylus 905, is a flick-tap. It consists of two parts that are subsequent to a pie menu activation input. The pie menu activation input here is a pointer down event at 1430 within the pie menu activation zone at 1420. The first part of the pie menu configuration invocation input is similar to the pie menu selection input in that it is a flick, shown here with a start point 1430 within the pie menu activation zone 1420 and an end point 1440. The pie sector 1470 for which the at least one associated configuration menu is invoked is determined based on the direction of this flick. The second part of the pie menu configuration invocation input 1405 is a tap 1460. The tap 1460 is made adjacent to the end point 1440 of the first part of the pie menu configuration invocation input, within a circle 1450 of a predetermined radius and within a predetermined time after the completion of the first part of the pie menu configuration invocation input.

It will be appreciated that while the pie menu configuration invocation input 1405, or any other input, is here shown being effected using a stylus 905, any other input device, including, but not limited to, finger-operated touch screens, touch pads, track points, mice, keyboards and analogue joysticks can be used for the user input 1405. It will be appreciated that other pie menu configuration invocation inputs are possible, such as but not limited to, a tap-flick, flick-flick or flick-reverse.

Upon the completion of the second part of the pie menu configuration invocation input, a configuration menu 1480 is displayed. This configuration menu 1480 is shown as a single overlay menu that takes up substantially all of the screen area and is situated in a fixed position on screen. Such implementation may occur on mobile devices such as the one shown in FIG. 1, for which the maximization of menu size allows for easier selection of the selection areas of menu items. On other systems, the configuration menu may take up a significantly smaller part of the screen.

The configuration menu 1480 is divided regularly into menu item selection areas such as 1485, with the association of menu items such as 1490, 1495 to the menu item selection areas substantially static per each individual configuration menu.

Menu item selection areas such as 1485 are active for user selection immediately upon the completion of the pie menu configuration invocation input, so that menu item selection is possible without a display of the configuration menu. The divisions between the selection areas, such as 1491 and 1492, may be displayed before the menu items themselves. Icons or other graphical representations of the menu items are displayed subsequent to the divisions. The precise nature of the display of the icons or other graphical representations of the menu items may vary. For example, some implementations may display graphical representations of menu items as quickly as possible, while others may add effects such as fade-ins or animation. Factors influencing the display include aesthetic considerations, device capabilities or user preference.

In the embodiment illustrated in FIG. 14, the configuration menu is a linear location selection menu, from which a selection is made when a user pointer input 1406 subsequent to the pie menu configuration invocation input ends within the selection area of a menu item. This user pointer input may be another tap, but could be any pointer input as long as it terminates within a selection area. In the embodiment illustrated in FIG. 14, selection of a menu item then both assigns the selected menu item to the pie menu sector and executes any actions associated with the assigned menu item. User input that terminates in an area outside of any menu item selection area cancels the configuration with neither a menu item assignment being effected nor any other action being executed.

The indicator 1408 is a graphical representation of the pie menu. The pie menu sector with which the currently displayed configuration menu is associated is highlighted or otherwise emphasized.

While in the present embodiment illustrated in FIG. 14 a selected menu item is assigned to the pie menu sector and any actions associated with the assigned menu item are executed, other embodiments may be implemented. There could be additional selection inputs that effect just the assignment of the selected menu item to the pie menu sector, or that effect only the execution of any actions associated with the selected menu item. In such an alternative embodiment, a user input that leads to just the configuration could include dragging a menu item like 1490 from its menu item selection area 1485 onto the graphical indicator 1408, and a user input that leads to just the execution of any actions associated with the menu item could be a pointer down on a menu item selection area like 1485 followed by a rest exceeding a preset amount of time. Of course, other input gestures are possible.

While the present embodiment of a configurable pie menu provides for an operation of a pie menu that does not require input hardware beyond a basic pointing device, the embodiment may of course be implemented on all kinds of devices that have such input hardware beyond a basic pointing device.

When a configurable pie menu, such as the embodiments illustrated in FIGS. 11 and 12 or FIG. 14, is implemented on a system that has an input device with multiple buttons such as, but not limited to, a standard computer keyboard, such multiple buttons may additionally be used as a pie menu selection and/or pie menu configuration invocation input. Such additional use may enable the user to e.g. use the pointing device to draw on an electronic canvas while selecting various tools from the pie menu employing the multiple buttons.

With an implementation of embodiments of a configurable pie menu, on a computer system comprising a standard keyboard, the buttons on the keyboard to be assigned as input buttons for the pie menu may be arranged in a way that is related to the shape of the pie menu. For example, for a regular, breadth-eight pie menu, a group of nine buttons, arranged as aligned rows of three buttons each, would be a preferred, though not necessary, way to map the keys. For other pie menu shapes and sector numbers other mappings, such as to a rhombus of four keyboard buttons for a breadth-four pie menu, could be implemented.

With operation of the pointing device being performed by the right hand of many users, a grouping of these buttons to the left of the keyboard where the user's left hand naturally stays while typing could be employed. One way of mapping the controls would then be to assign them to the Q, W, E-A, S, D-Z, X, C buttons on a standard US "QWERTY" layout keyboard, or buttons in other keyboard layouts that have similar positions to these. Other mappings, such as one to a group of buttons that are on the right-hand side of the keyboard for operation by left-handed users, are, of course, possible.

In such mapping, the Q, W, E-A, D-Z, X, C buttons correspond to the respective directions of the compass and the pie menu sectors assigned to pointer input in these directions, while the S button is assigned the function of the pie menu activation zone.

Further, a single press of one of the Q, W, E-A, D-Z, X, C buttons invokes the menu item currently assigned to the pie menu sector associated with the button. A double press, i.e. two consecutive presses within a preset short time, invokes the at least one configuration menu associated with the pie sector. Other implementations, such as distinguishing between a pie menu selection and a pie menu configuration invocation input according to the time the button is pressed, are possible. Within a configuration menu, individual menu items may be mapped to individual keyboard buttons to allow for selection from the configuration menu using the keyboard in addition to selection using the pointing device. Pressing "S" may invoke or hide a display of the pie menu.

If a supplementary button mode of operation is implemented, it may be beneficial to present the mapping of the buttons to the user in a way that will help him remember the buttons assigned to particular pie menu sectors. One way of implementing this mode of operation would be to display the letters, numbers or other input that the mapped buttons, normally generate spatially related to the pie menu sectors while they are graphically displayed, but other ways of doing this are feasible within the scope of the present embodiments. For example, in systems that comprise an Art Lebedev™ Optimus Maximus™ keyboard, the OLED displays within the buttons could be programmed to display the overall shape of a pie menu across a group of buttons, or to display an icon indicating the current function assigned to a pie menu sector that is mapped to an individual button.

Figure 15:
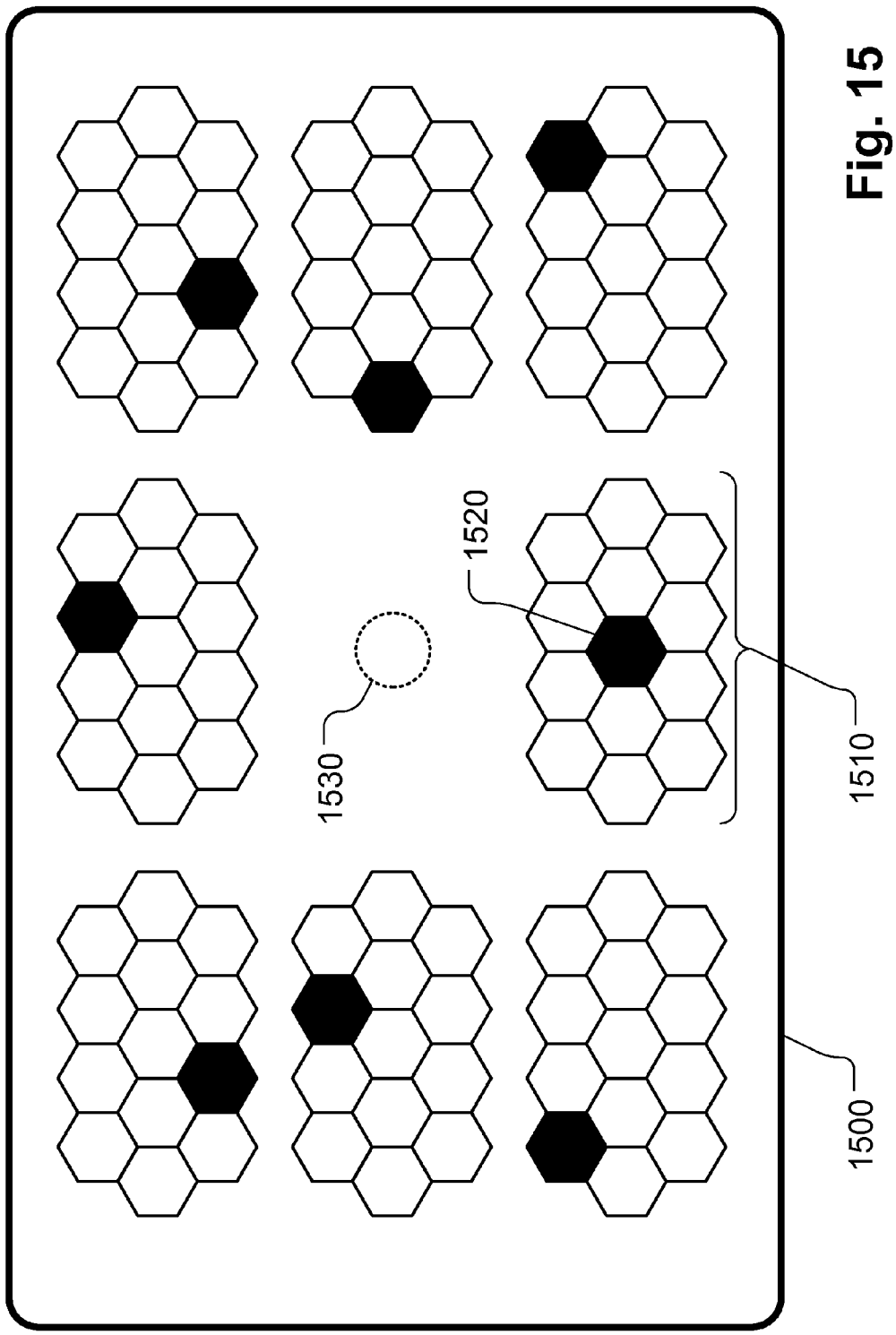
FIG. 15 illustrates a display of an overview of currently assigned menu items and their respective configuration menus, in accordance with at least one embodiment of a configurable pie menu.

FIG. 15 illustrates a graphical display that allows a user to gain a quick overview of both the menu items currently assigned to the pie menu sectors and the totality of menu items that can be assigned to the pie menu sectors. Upon a specific user input, the configuration menus as they would currently be displayed upon each of the configuration menu invocation inputs are concurrently displayed in reduced size (e.g. 1510) on screen 1500, positioned so as to indicate their association with a pie menu sector. The menu item currently assigned to a pie menu sector with which the configuration menu is associated is highlighted, e.g. 1520. For the present embodiment, the specific user input causing this display could e.g. be a double tap in the pie menu activation zone 1530. Furthermore, this display could allow for one or several subsequent assignments of menu items from the displayed configuration menus to the pie menu sectors.

Flow of a Preferred Embodiment of the Invention

Figure 16:
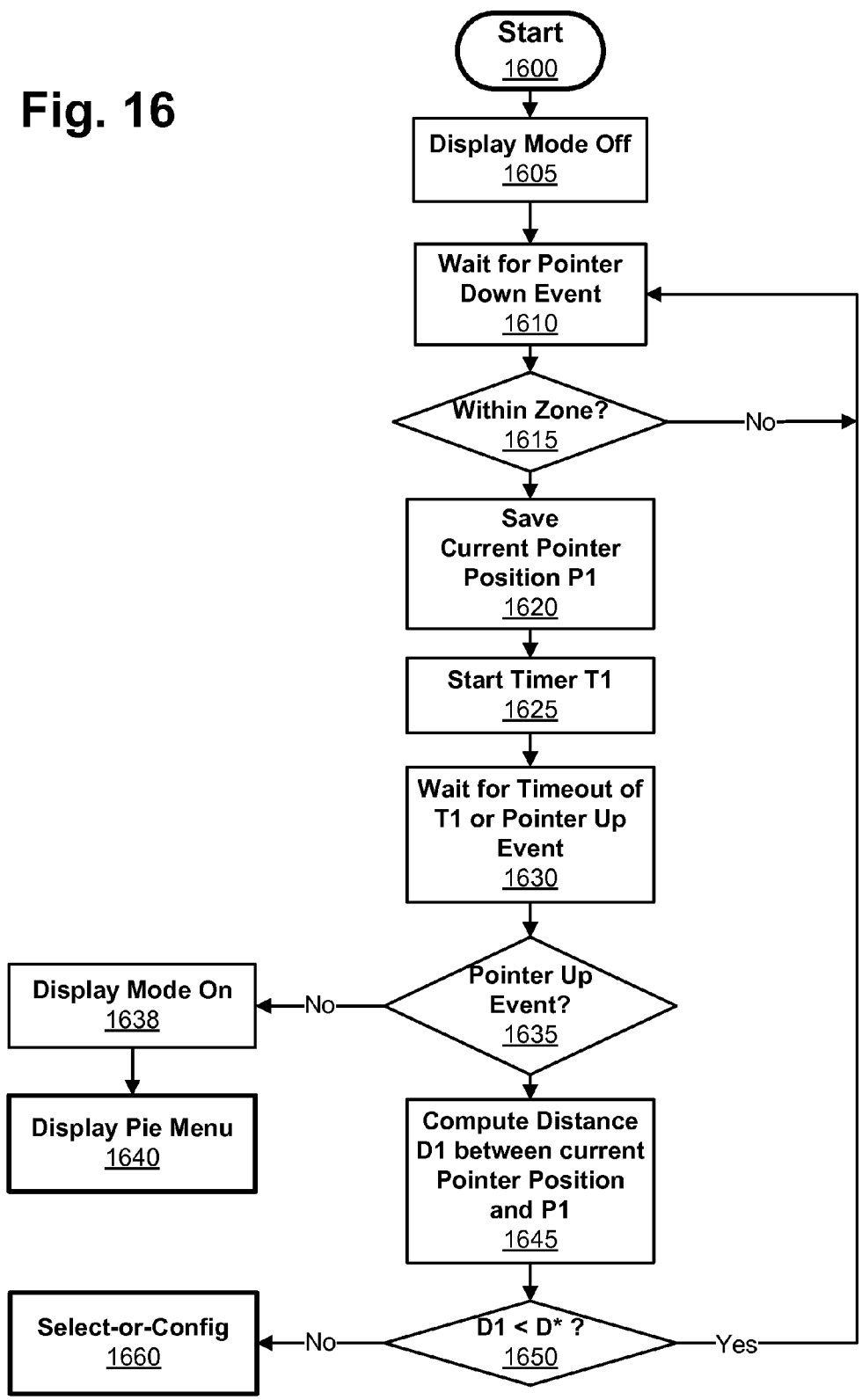
FIG. 16 illustrates a flow for at least one embodiment of a configurable pie menu.

The flow of the preferred embodiment illustrated in FIG. 14 is shown in FIG. 16. The flow starts 1600 with switching off 1605 the display mode.

The flow then waits 1610 for a pointer down event. If this pointer down event is determined 1615 to be outside of the pie menu activation zone, then the flow returns to waiting 1610 for a pointer down event. If the pointer down event is, however, determined 1615 to be within the pie menu activation zone, the current cursor position is saved 1620 to P1 and a timer T1 is started 1625. The flow then waits 1630 for the first of either a timeout of the timer T1 or a pointer up event.

If a pointer up event is not detected 1635 before the timer T1 times out, then the display mode is switched on 1638 and the pie menu is displayed 1640. If a pointer up event is detected 1635 before timer T1 times out, then the distance D1 between the current pointer position and the saved pointer position P1 is computed 1645. If this distance D1 is determined 1650 to be shorter than a threshold distance D* for the minimum length of a flick, then the flow waits 1610 for a next pointer down event.

If the distance D1 is determined 1650 to not be shorter than the threshold D*, then the input is interpreted as a flick and it is determined 1660 whether the user input is a pie menu selection input or whether it is a configuration menu invocation input.

Figure 17:
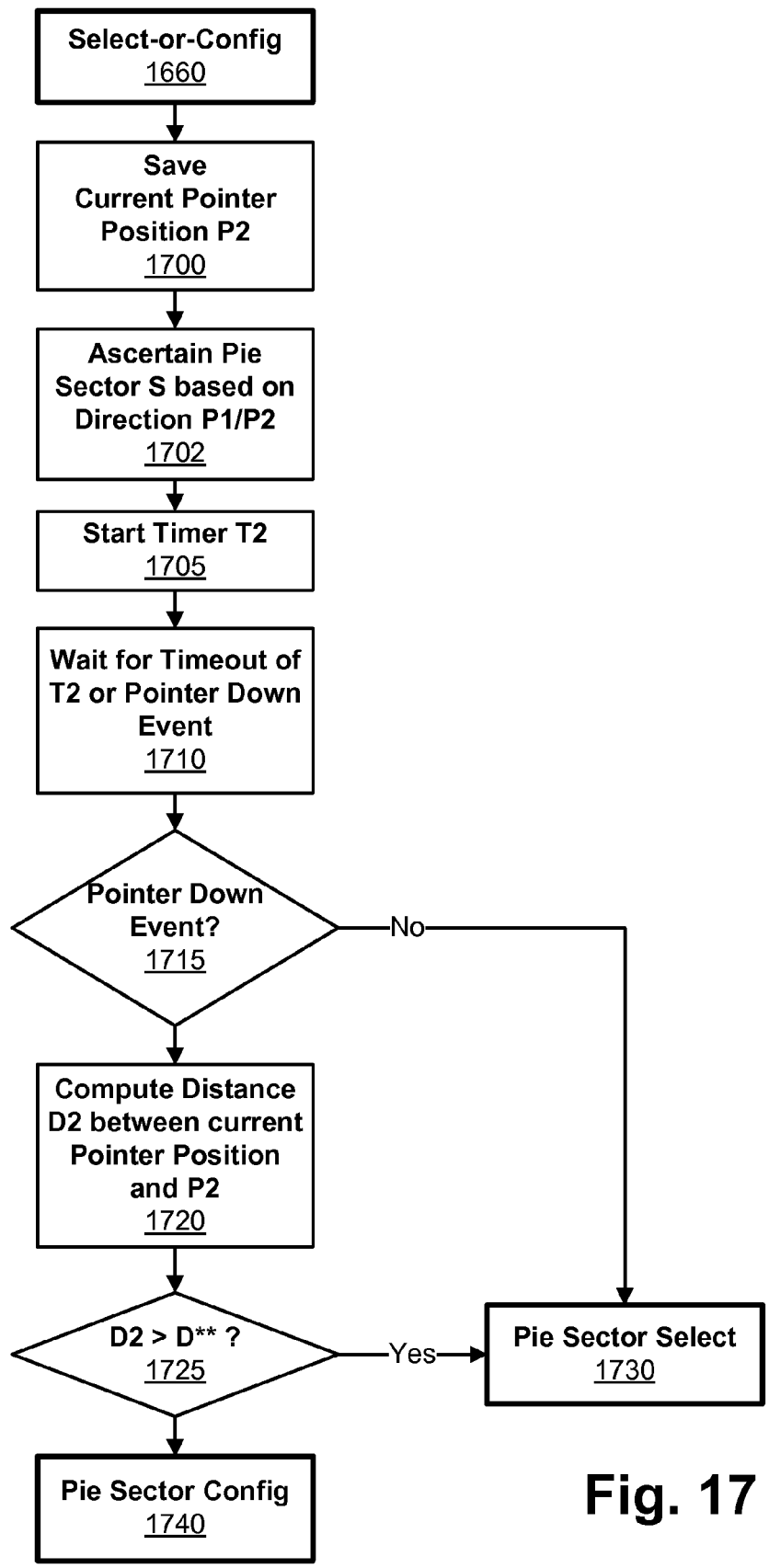
FIG. 17 illustrates a flow for at least one embodiment of a configurable pie menu.

FIG. 17 is a flow chart of determining 1660, with reference to FIG. 16, an input to be a pie menu selection or a pie menu configuration invocation input.

The current pointer position at the end of the flick is saved 1700 as P2. The pie sector S associated with the current input is ascertained 1702 based on the direction of the input determined from the saved pointer positions P1 and P2. A timer T2 is started 1705, and the flow waits 1710 for the first of either a timeout of T2 or a pointer down event.

If a pointer down event is not detected 1715 before the timer T2 times out, then the flick is a pie menu selection input and then the selection of a pie sector is started 1730. If a pointer down event is detected 1715 before the timer T2 times out, then the distance D2 between the current pointer position and the saved pointer position P2 is computed 1720.

If this distance D2 is determined 1725 to be longer than a threshold value D needed for the pointer down event to be interpreted as part of a pie menu configuration invocation input then the selection 1730 of a pie sector is started. If the distance is determined 1725 to be not longer than the threshold value D, then the pointer down event is interpreted as being part of a flick-tap pie menu configuration invocation input and the pie sector configuration 1740 is started.

Figure 18:
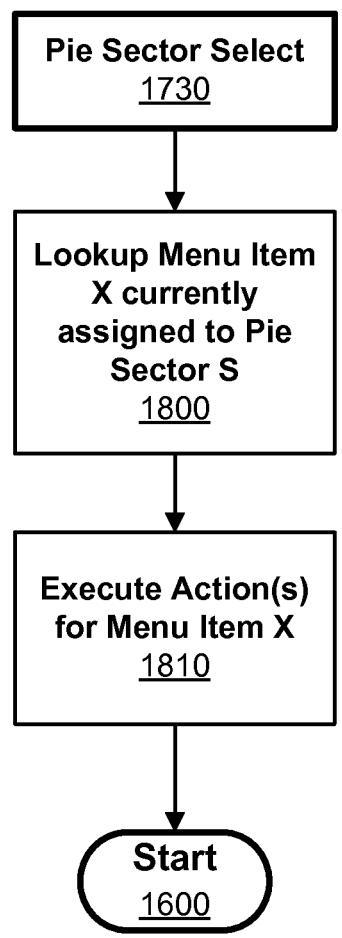
FIG. 18 illustrates a flow for at least one embodiment of a configurable pie menu.

FIG. 18 is a flow chart of the selection 1730 of a pie sector. The menu item X currently assigned to the selected pie sector S is looked up 1800, and any actions associated with menu item X are executed 1810. After this the flow returns to the start 1600.

Figure 19:
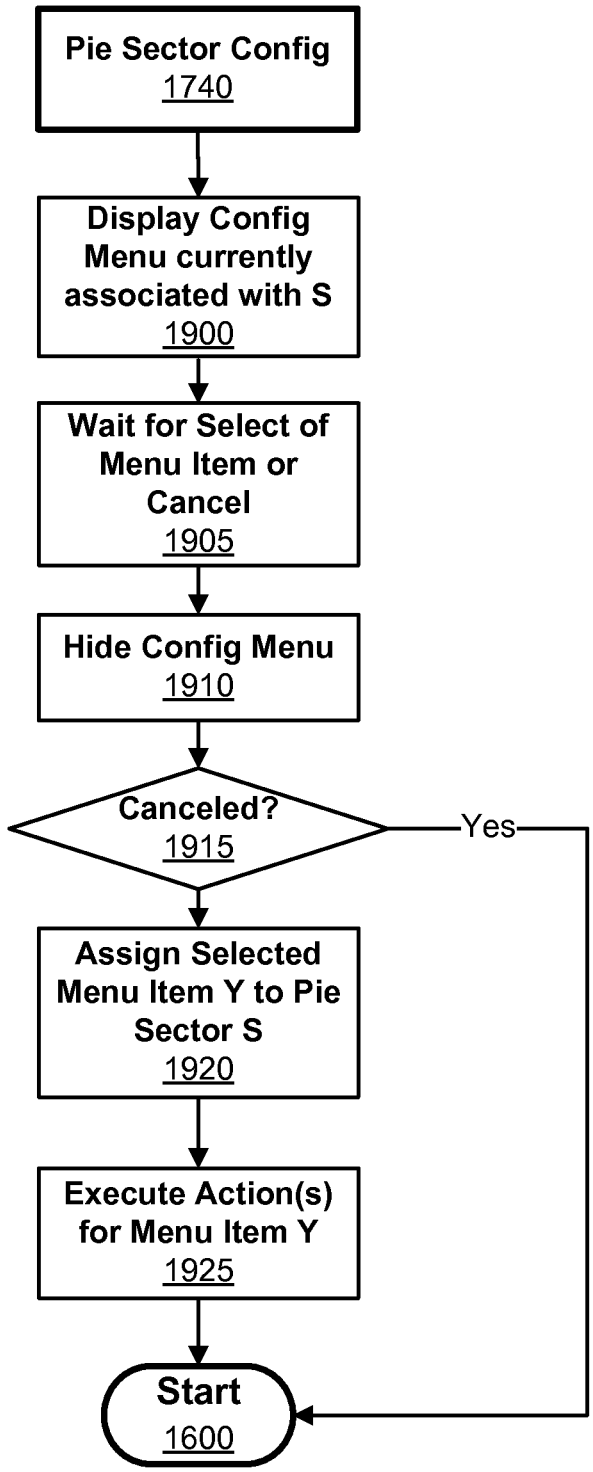
FIG. 19 illustrates a flow for at least one embodiment of a configurable pie menu.

FIG. 19 is a flow chart of the configuration 1740 of a pie sector. The configuration menu currently associated with the pie sector S is displayed 1900.

The flow then waits 1905 for the selection of a menu item or cancelation through user input. Upon reception of a user input, the configuration menu is hidden 1910.

If the user input is determined 1915 to be one indicating a cancellation, then the flow returns to its start state 1600. If the user input is a configuration menu item selection input, then the selected menu item Y is assigned 1920 to the pie menu sector S and any actions associated with menu item Y are executed 1925.

The flow then returns to its start state 1600.

Figure 20:
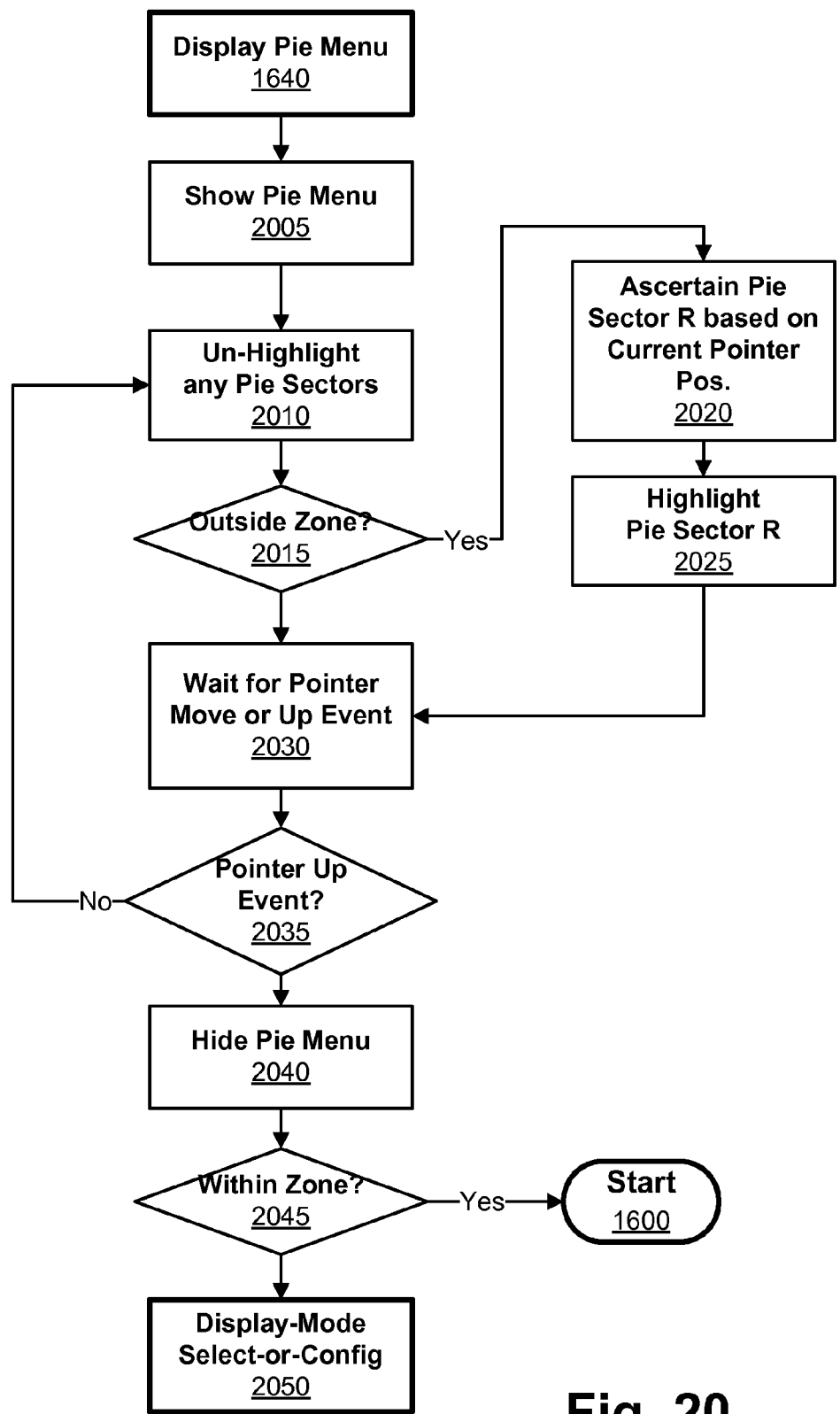
FIG. 20 illustrates a flow for at least one embodiment of a configurable pie menu.

FIG. 20 illustrates the display of the pie menu 1640.

First the pie menu is shown 2005 and highlighting of any presently highlighted pie menu sectors is ceased 2010. It is then determined 2015 whether the current pointer position is outside the pie menu activation zone.

If the current pointer position is determined 2015 to be outside the pie menu activation zone, then a pie sector R is ascertained 2020 based on the current pointer position, and the pie sector R is highlighted 2025.

After pie sector R has been highlighted 2025, or if the current pointer position is determined 2015 to be inside the pie menu activation zone, then the flow waits 2030 for the first of either a pointer move or up event.

If the pointer event is determined 2035 not to be a pointer up event, then the flow returns to step 2010. If the pointer event is determined 2035 to be a pointer up event, then the pie menu is hidden 2040 and it is determined 2045 whether the current pointer position is within the pie menu activation zone. If the current pointer position is within the pie menu activation zone, then the flow returns to the start 1600. If the current pointer position is outside of the pie menu activation zone, then the display mode selection or configuration 2050 is started.

Figure 21:
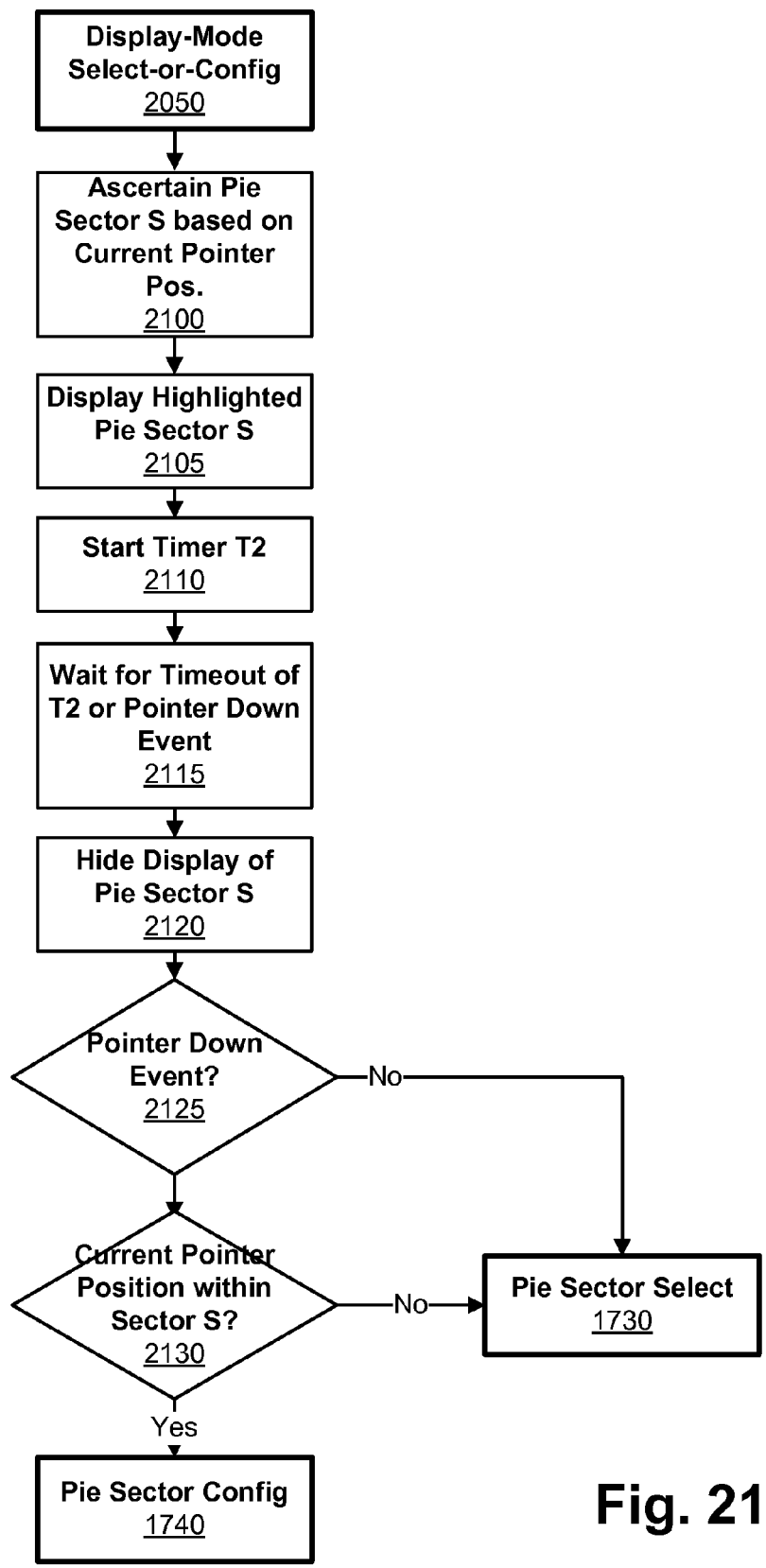
FIG. 21 illustrates a flow for at least one embodiment of a configurable pie menu.

FIG. 21 is a flow chart of the display mode selection or configuration 2050.

First a pie sector S based on the current pointer position is ascertained 2100, and the pie sector is highlighted 2105. A timer T2 is started 2110, and the flow then waits 2115 for the first of either a timeout of the timer T2 or a pointer down event. Upon the timeout of the timer T2 or a pointer down event, the display of pie sector S is hidden 2120. It is then determined 2125 whether there was a pointer down event. When there was no pointer down event, the pie sector selection 1730 is started.

If a pointer down event was determined 2125 to have occurred, then it is determined 2130 whether the current pointer position is within the pie sector S. If not, then the pie sector selection 1730 is started. If the current pointer position is determined 2130 to be within the pie sector S, then the pie sector configuration 1740 is started.

Systems, methods, and other implementations for a configurable pie menu are described herein. A pie menu has sectors of which at least one sector is both associated with a currently assigned menu item and at least one configuration menu. These associations can change dynamically. The operation of the pie menu is started by a pie menu activation input. Subsequent user input may then be interpreted as a pie menu selection input or a pie menu configuration invocation input. The pie menu allows for a mode of selection without the pie menu being displayed.

A pie menu configuration invocation input invokes the at least one configuration menu associated with a determined pie menu sector. The configuration menus provide a larger set of menu items, one of which is the menu item currently assigned to the pie menu sector. A menu item selected from the invoked configuration menu is assigned to the pie sector with which the configuration menu is associated. Additionally, any actions associated with the menu item selected from the configuration menu may be executed. The menu items contained in the configuration menus and their mode and details of display can change dynamically.

Although the embodiments of systems, methods, and other implementations related to configurable pie menus have been described in language specific to structural features and/or methodological acts, the embodiments defined in the appended claims are not necessarily limited to the specific features or acts described above. Rather, the features and acts are disclosed as exemplary forms of implementing configurable pie menus.

What is claimed is:

1. A method for configuring a pie menu, comprising:
   determining a pie menu activation input via an input device connected to a computing device;
   determining whether a subsequent input via said input device is a pie menu selection input or a pie menu configuration invocation input; and,
   on determining a pie menu selection input,
   ascertaining a pie sector associated with the pie menu selection input,
   selecting a menu item assigned to said pie sector, and executing said menu item;
   on determining a pie menu configuration invocation input,
   ascertaining a pie sector associated with the pie menu configuration invocation input,
   determining whether at least one configuration menu is associated with the ascertained pie sector,
   upon determining that at least one configuration menu is associated with the ascertained pie sector,
   invoking the at least one configuration menu associated with the ascertained pie sector,
   wherein the invocation effects displaying said at least one configuration menu on a display connected to said computing device,
   providing menu items for user selection from the invoked at least one configuration menu, and
   determining a pie menu configuration selection input subsequent to the display of a configuration menu, and,
   on determining a pie menu configuration selection input, assigning the selected menu item to the ascertained pie sector.

2. A method according to claim 1, further comprising immediately executing any actions associated with the menu item selected from the configuration menu.

3. A method according to claim 1, wherein the pie menu activation input is at least one of a pointer down event in a pie menu activation zone, a click of a mouse button, a hot-key press or a stylus button press.

4. A method according to claim 1, wherein the pie menu configuration invocation input starts in a pie menu activation zone.

5. A method according to claim 4, wherein a graphical representation of the pie menu activation zone includes a graphical indication of a program state.

6. A method according to claim 1, wherein the pie menu configuration invocation input includes a flick.

7. A method according to claim 1, wherein the pie menu configuration invocation input is at least one of a flick-tap, tap-flick, flick-flick or flick-reverse flick.

8. A method according to claim 1, wherein the pie menu configuration invocation input includes a touch input.

9. A method according to claim 1, wherein the at least one configuration menu is a linear location menu.

10. A method according to claim 1, wherein the display of the at least one configuration menu includes a graphical indicator of the pie sector with which the at least one configuration menu is associated.

11. A system to facilitate a configurable pie menu, comprising:
   an input component to:
   determine the reception of a pie menu activation input;
   determine the reception of a subsequent input where such input is a pie menu configuration invocation input or a pie menu selection input; and
   determine the reception of a pie menu configuration selection input subsequent to a display of a configuration menu;
   a menu item execution component to:
   ascertain a pie sector associated with the pie menu selection input, and
   execute the pie menu item assigned to said pie sector;
   a configuration menu component to:
   ascertain a pie sector associated with the pie menu configuration invocation input;
   determine whether at least one configuration menu is associated with the ascertained pie sector;
   upon determining that at least one configuration menu is associated with the ascertained pie sector,
   invoke the at least one configuration menu; and
   a pie sector menu item assignment component to:
   assign a menu item selected by the pie menu configuration selection input to the ascertained pie sector.

12. A system according to claim 11, wherein the input component receives inputs starting in a pie menu activation zone.

13. A system according to claim 11, further comprising a pie menu item execution component that immediately executes any actions associated with the assigned menu item.

14. A system according to claim 11, wherein the pie menu activation input is at least one of a pointer down event in a pie menu activation zone, a click of a mouse button, a hot-key press or a stylus button press.

15. A system according to claim 11, wherein the pie menu configuration invocation input starts in a pie menu activation zone.

16. A system according to claim 15, wherein a graphical representation of the pie menu activation zone includes a graphical indication of a program state.

17. A system according to claim 11, wherein the pie menu configuration invocation input includes a flick.

18. A system according to claim 11, wherein the pie menu configuration invocation input is at least one of a flick-tap, tap-flick, flick-flick or flick-reverse flick.

19. A system according to claim 11, wherein the at least one configuration menu is a linear location menu.

20. A system according to claim 11, wherein the display of the at least one configuration menu includes a graphical indicator of the pie sector with which the at least one configuration menu is associated.

21. A computer-readable, non-transitory medium storing instructions that, when executed, cause one or more processors to
   determine a pie menu activation input via an input device connected to a computing device;
   determine a subsequent input via said input device to be a pie menu selection input or a pie menu configuration invocation input; and,
   when a pie menu selection input has been determined,
   ascertain a pie sector associated with the pie menu selection input,
   select a menu item assigned to said pie sector, and
   execute said menu item;
   when a pie menu configuration invocation input has been determined,
   ascertain a pie sector associated with the pie menu configuration invocation input;
   determine whether at least one configuration menu is associated with the ascertained pie sector,
   upon determining that at least one configuration menu is associated with the ascertained pie sector,
   invoke the least one configuration menu associated with the ascertained pie sector;
      wherein the invocation effects displaying said at least one configuration menu on a display connected to said computing device;
   provide menu items for user selection from the invoked at least one configuration menu; and
   when a subsequent pie menu configuration selection input has been determined,
   assign the selected menu item to the ascertained pie sector.

* * * * *